US006641796B2

(12) United States Patent
Micco et al.

(10) Patent No.: US 6,641,796 B2
(45) Date of Patent: Nov. 4, 2003

(54) METHOD FOR MAKING ZEOLITES AND ZEOLITE MIXTURES HAVING ENCHANCED CATION EXCHANGE PROPERTIES

(75) Inventors: Daniel J. Micco, Bridgeport, PA (US); Richard J. Hinchey, Blue Bell, PA (US)

(73) Assignee: PQ Corporation, Berwyn, PA (US)

( * ) Notice: Subject to any disclaimer, the term of this patent is extended or adjusted under 35 U.S.C. 154(b) by 317 days.

(21) Appl. No.: 09/810,914

(22) Filed: Mar. 16, 2001

(65) Prior Publication Data

US 2001/0053741 A1 Dec. 20, 2001

Related U.S. Application Data

(60) Provisional application No. 60/190,185, filed on Mar. 17, 2000, provisional application No. 60/213,076, filed on Jun. 21, 2000, and provisional application No. 60/246,632, filed on Nov. 8, 2000.

(51) Int. Cl.[7] .............................................. C01B 39/14
(52) U.S. Cl. ...................... 423/700; 423/709; 423/716; 423/DIG. 21; 423/DIG. 24; 423/717
(58) Field of Search ................................ 423/700, 709, 423/712, 717, DIG. 21, DIG. 24, 716

(56) References Cited

U.S. PATENT DOCUMENTS

| | | | |
|---|---|---|---|
| 3,574,538 A | 4/1971 | McDaniel et al. | |
| 3,808,326 A | 4/1974 | McDaniel et al. | |
| 4,235,856 A | 11/1980 | Kostinko | |

(List continued on next page.)

FOREIGN PATENT DOCUMENTS

| | | |
|---|---|---|
| EP | 0 127 399 | 12/1984 |
| FR | 2 376 073 | 7/1978 |
| WO | 00/43482 | 7/2000 |

OTHER PUBLICATIONS

Bekkum et al., *Introduction to Zeolite Science and Practice*, 1991, pp. 359, 377.
Sugiyama et al., "AFM observation of double 4–rings on zeolite LTA crystals surface," *Microporous and Mesoporous Materials* 28 (1999), pp. 1–7.
Kurzendorfer et al., "Sodium Aluminosilocates in the Washing Process," *Processed of the 7th International Zeolite Conference*, Tokyo, Aug. 17–22, 1986, pp. 1009–1016.

(List continued on next page.)

*Primary Examiner*—David Sample
(74) *Attorney, Agent, or Firm*—RatnerPrestia

(57) ABSTRACT

A zeolite A or an A/X mixture having an LCC>70 g liquid/100 g zeolite (hydrated) and a cold water CER>200 mg $CaCO_3$/gram anhydrous zeolite (hydrated). The zeolite product may have a crystal size of 0.1–0.7 microns, a bulk density of 0.19–0.37 g/ml, and a median particle size of 1–5 microns. A process for making zeolite A or A/X mixtures is also claimed, including mixing a sodium silicate solution, a sodium aluminate solution, and an amorphous aluminosilicate initiator gel in a mixing vessel to create an aluminosilicate synthesis gel, and crystallizing the aluminosilicate synthesis gel to form zeolite crystals. The sodium aluminate solution may be added gradually to at least the sodium silicate solution at a rate of about 1–5% of the total batch alumina per minute, and/or a percentage of the total batch alumina may be added as alumina trihydrate (ATH) powder. The amount of total batch alumina added as an undissolved source of soluble alumina and the presence or absence of initiator or "seed" gel determines whether the resulting zeolite product is an A/X mixture or only zeolite A. A process to augment the yield of a synthesis mixture is also claimed, comprising providing undissolved alumina in substantial excess of stoichiometric requirements in a primary crystallization step, yielding a slurry of crystalline zeolite A in an alumina-enriched mother liquor, and then adding soluble silicate to initiate a second stage of very rapid crystallization. Detergents containing zeolites of this invention are claimed.

47 Claims, 9 Drawing Sheets

U.S. PATENT DOCUMENTS

| | | | | |
|---|---|---|---|---|
| 4,263,266 A | * | 4/1981 | Michel et al. | 423/700 |
| 4,274,975 A | | 6/1981 | Corkill et al. | |
| 4,303,629 A | * | 12/1981 | Strack et al. | 423/711 |
| 4,340,573 A | | 7/1982 | Vaughan et al. | |
| 4,605,509 A | | 8/1986 | Corkill et al. | |
| 5,350,785 A | | 9/1994 | Sander et al. | |
| 5,366,720 A | | 11/1994 | Caglione et al. | |
| 5,645,811 A | * | 7/1997 | Kuhm et al. | 423/700 |
| 5,908,823 A | | 6/1999 | Zatta et al. | |
| 5,942,207 A | | 8/1999 | Moini et al. | |
| 5,948,383 A | | 9/1999 | Kuznicki et al. | |
| 6,416,732 B1 | * | 7/2002 | Curran et al. | 423/700 |

OTHER PUBLICATIONS

Mukaiyama et al., "Calcium Ion Exchanging Behavior of Zeolite A in the Washing Process," *Proceedings of the 7th International Zeolite Conference*, Tokyo, Aug. 17–22, 1986, pp. 1017–1023.

Guth et al., "Preparation et proprietes d'une zeolite du type A enrichie en silicium," Bull. Soc. fr. Mineral. Cristallogr. 93 (1970), pp. 59–65.

Brunauer et al., "Adsorption of Gases in Multimolecular Layers," *J. Am. Chem. Soc.* 60 (1938), pp. 309–319.

International Search Report dated Sep. 19, 2001.

* cited by examiner

Figure 7. Crystallization of Zeolite A With Excess ATH

METHOD FOR MAKING ZEOLITES AND ZEOLITE MIXTURES HAVING ENCHANCED CATION EXCHANGE PROPERTIES

CROSS-REFERENCE TO RELATED APPLICATIONS

This application claims priority of U.S. Provisional Application Nos.: 60/190,185, filed Mar. 17, 2000; 60/213,076, filed Jun. 21, 2000, and 60/246,632, filed Nov. 8, 2000.

TECHNICAL FIELD

This invention relates to zeolites, and especially zeolite A and mixtures of zeolite A and zeolite X having a small crystal size and particle size, and enhanced liquid carrying capacity, cation exchange rate, and cation exchange capacity. Such zeolites have a number of uses, but are especially useful as builders in combination with detergents in cleaning formulations.

BACKGROUND OF THE INVENTION

Zeolites, as is commonly known in the art, are crystalline aluminosilicates having fully cross-linked open framework structures made up of corner-sharing $SiO_4$ and $AlO_4$ tetrahedral groups. Zeolites belong to the class of minerals referred to generally as tectosilicates, because their crystalline architecture can be idealized as being constructed from silicon atoms in tetrahedral, four-fold coordination with oxygen atoms in a 3-dimensional lattice. Each silicon atom in the structure has a nominal $4^+$ charge and shares 4 oxygen atoms (each having a nominal charge of $2^-$) with other silicon atoms in the crystal lattice.

Substitution of the isoelectronic $Al^{3+-}$ for $Si^{4+}$ creates a charge inbalance on the lattice that must be rectified by the incorporation of additional cations close by Al sites in the framework. Steric accommodation of these cations directs the crystallization of aluminosilicates towards the formation of more open structures containing continuous channels or micropores within the crystal. These structural micropores in the anhydrous zeolites allow the passage and adsorption of molecules based on size giving the materials molecular sieving properties. The cations themselves are not part of the crystal framework and can usually be replaced by equivalently charged species without damage to the lattice. In zeolite structures such as A and X the pore size is large enough to permit the facile passage and exchange of cations in aqueous solutions. The as-synthesized forms of zeolites A and X contain Na cations that can be exchanged for $Ca^{2+}$ and $Mg^{2+}$ ions present in so-called "hard" waters and this gives these two zeolites particular value as water "softening" builders in detergent formulations.

Zeolites in general can be represented empirically as:

$$M_{2/n}O.Al_2O_3.xSiO_2.yH_2O;$$

wherein: M represents an exchangeable cation of valence n which is 1 or 2; x represents the number of moles of silica per mole of alumina and is typically about 2 for NaA and 2–3 for zeolite X; and y represents the number of moles of water per mole of alumina. M is typically a Group I or II ion, although other metal, non-metal and organic cations may also balance the negative charge created by the presence of aluminum in the structure. In addition to $Si^{4+}$ and $Al^{3+}$, other elements can also be present in the zeolitic framework.

Zeolites are frequently categorized by their crystalline structure. See W. M. Meier, D. H. Olson, and C. Baerlocher, 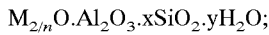 *Atlas of Zeolite Structure Types,* Elsevier Press (1996) $4^{th}$ edition. Among these structure types are zeolite A and zeolite X, which are the subject of the present invention. Zeolite A has the usual formula of: $Na_2O.Al_2O_3.2.0SiO_2.4.5H_2O$, and zeolite X has an empirical formula of: $Na_2O.Al_2O_3.xSiO_2.6H_2O$, wherein x is in the range of 2–3.

The microporous structure makes zeolites useful in a number of industrial applications, such as drying agents molecular sieves (highly selective adsorbents), ion exchangers, and catalysts. Particles consisting of agglomerated zeolite crystals also have a macroporosity that is useful in the manufacture of dry laundry detergents, for example, where the particles act as a carrier for liquid detergent chemicals. The amount of liquid detergent chemical that can be carried by a particular zeolite powder is indicated by its liquid carrying capacity (LCC), often expressed as the grams liquid per 100 grams of "as-is" zeolite. Unless otherwise indicated herein, the "as is" weight of the zeolite includes any interstitial water of hydration. Zeolites for application as detergent builders are typically sold in a hydrated form wherein the weight of the hydrated zeolite is approximately 20–22% water, also referred to as 20–22% LOI. LOI stands for the "loss on ignition" resulting when a zeolite sample is heated to a specified elevated temperature to drive off volatile components such as water or organic materials.

The effectiveness of a detergent is often influenced in complex ways by the "hardness" of the water. Water hardness is measured in terms of the weight of $CaCO_3$ (in parts per million, ppm) equivalent to the concentration of soluble Ca and Mg present in water. Ca and Mg cations interfere with the action of the detergent in removing dirt from articles of clothing by reacting with detergent species. Ca in the dirt itself is thought to promote adhesion to fabrics and extraction of Ca by the zeolite may amplify the effectiveness of the detergent.

The Na-form of zeolite A exhibits a highly selective exchange affinity for $Ca^{2+}$ ions, the primary cation found in potable water in the United States, whereas zeolite X has a particularly high affinity for exchanging both calcium and magnesium ions. The greater facility with which the X phase takes up $Mg^{2+}$ is believed to be due to the larger pore size of this zeolite which more readily accommodates entry of the significantly larger hydrated Mg cation. When Mg is present in solution in high proportion it also interferes and slows the rate of Ca uptake by zeolite A. For waters containing predominantly Ca, zeolite A alone provides satisfactory exchange performance, but for waters containing higher proportions of Mg as well, it is advantageous to use combinations of zeolites A and X. In such applications it is preferable to use a zeolite X component of the so-called "low silica" variety (LSX) with a composition and exchange capacity per unit weight that is equivalent, or nearly so, to that of zeolite A. The separate manufacture of LSX for use in combination with zeolite A is more expensive, so it is advantageous to accomplish direct synthesis of the mixed zeolite Group I ion product in the same low cost process used to manufacture zeolite A.

To maximize the effectiveness of detergent components of a washing formulation, it is critically important to remove the hardness components from the wash water as rapidly as possible. Ca removal, or sequestration, by a solid material occurs via a sequence of steps: a) $Ca^{2+}$ diffusion through the solution to the zeolite particle; b) diffusion of $Ca^{2+}$ across the static film boundary at the crystal/solution interface; c) distribution of $Ca^{2+}$ over exchange sites by diffusion of the ion through zeolite micropores. The slowest, and therefore rate-determining, steps in this exchange process are believed to be associated with diffusion across the film boundary layer and distribution through the crystal. Vigorous agitation in the solution phase and dispersion of zeolite powder in the liquid facilitates transfer of $Ca^{2+}$ through the bulk solution so that this step is not rate-limiting. Recognizing this, zeolite manufacturers make every effort to manufacture zeolite detergent builder materials with smaller particle size so as to increase the net rate of Ca/Mg sequestration. Larger particles, especially those greater than 10 microns in diameter, must also be minimized to avoid the unsightly deposition of zeolite residues on dark colored articles of clothing. As would be expected, the rate of Ca removal from solution is strongly dependent upon the temperature of the exchange solution. Ca diffusion processes, and hence their exchange rates, in zeolites occur more rapidly in hot water than in cold. To be useful as performance builders in detergent powders for cold water application, it is desirable to improve the exchange rate of Ca on zeolite A powders.

One strategy to increase exchange rate is to significantly reduce zeolite particle size. For detergent zeolite powder, however, other criteria constrain the manufacture of very small zeolite particles. Cost is an important market consideration. Some methods for the synthesis of very small particles require more dilute synthesis gels with reduced batch yield, and this raises unit costs of manufacture. Other methods require more costly reagents or more eccentric compositions that complicate the recycle operations typically of efficient, low-cost manufacturing processes. Ultra-small particles become much more difficult to separate from is their synthesis mother liquors and wash effectively without the use of flocculating agents. The use of flocculating agents to facilitate solids separation is undesirable due to the potential for interaction of such agents with components of detergent formulations and to the unfavorable effect of flocculents on the dispersibility of zeolite powders in wash waters. Very fine powders tend to have very low bulk densities that require expanded storage volumes and make for more difficult powder handling.

One performance measure used for zeolite A detergent builders is to measure the $Ca^{2+}$ removed by a 0.5 gram sample of zeolite powder in a short time interval (2 minutes) from a solution at a fixed temperature containing 1000 ppm equivalents of $CaCO_3$ as $CaCl_2$. This quantity expressed as milligrams $CaCO_3$ per gram anhydrous zeolite is taken as a measure of the calcium exchange "rate" (CER). A second convention measures the quantity of Ca removed from the same solution after 15 minutes and equates this value to the effective Ca exchange "capacity" (CEC) expressed in the same units. 15 minutes is considered a practical time for the zeolite exchange to have come very near its equilibrium limit. As referred to herein, CER and CEC are measured at a solution temperature of 10° C. for applicability to cold water detergent applications. An exemplary CER and CEC procedure is described further herein. Obviously, good exchange performance in cold water invariably results in even better performance in water at higher temperature.

Zeolite A of this invention has a calculated maximum capacity of 7 milliequivalents per gram. This corresponds to a maximum theoretical exchange capacity equivalent to 350 ppm $CaCO_3$. Under the conditions used to evaluate the Ca exchange capacity of the zeolite A of this invention the observed Ca exchange capacity is generally somewhat superior to the capacity of commercial VALFOR® 100. CEC values for the zeolite A of this invention fall in the range 280–300 when measured at 10° C. whereas ordinary VALFOR® materials at the same temperature have CEC values of 250–280. The zeolite A of this invention is most distinguished from conventionally manufactured VALFOR® 100 in its more critical performance at 2 minutes in cold water where typical CER values are >200 and even >250 mg $CaCO_3$ per g zeolite approaching equilibrium limit (CEC) values so that a much larger fraction of the total exchange capacity is put to use during the critical initial minutes of the washing cycle where effective Ca removal is most important to the function of the detergent.

The superior cold water Ca exchange performance of the zeolites of this invention can be related to the significantly increased external surface area of the zeolite crystals. The enhanced surface areas measured on the products can be converted by calculation into an equivalent diameter of uniformly sized spherical particles of the same intrinsic density that have the same specific surface area. For zeolite A of conventional manufacture this hypothetical diameter is comparable to the observed particle and crystal sizes of the actual material. For the products of this invention, however, the hypothetical equivalent spherical diameter is very much smaller than the median particle size of crystalline agglomerates and smaller even than the size of individual crystallites. This surface area enhancement is thought to be due to the dramatically increased roughness, or fractal property, of the crystal surfaces generated by important modifications of the procedures for zeolite A synthesis. These procedures are thought to promote more rapid and disorderly growth of zeolite A crystals that results in this fractal character.

Zeolites can be made by a number of processes. One generalized industrial process for making zeolite A is shown schematically in FIG. 1. The process shown in FIG. 1 first comprises preparing a sodium aluminate solution in digester 10. A soluble aluminate solution may be prepared by dissolving $Al_2O_3.3H_2O$, also known as alumina trihydrate (ATH) or $Al(OH)_3$, in a solution of NaOH and water. The composition of this solution can be varied over a considerable range in terms of weight percent $Na_2O$ or $Al_2O_3$ dissolved. Compositions that provide stable solutions at ambient temperatures can be described in a binary phase diagram well-known in the art, such as for example as published in the *Kirk-Othmer Encyclopedia of Chemical Technology*, Fourth Edition, Vol. 2, p. 269 (1992). The aluminate solution can be prepared and analyzed and stored for later use or it can be prepared to a specific formulation as a batch for each batch synthesis of zeolite. Hot aluminate solutions with temperatures up to approximately 200° F. can also be used. In a commercial-scale operation, the sodium aluminate solution may be prepared by combining recycled "mother liquor" (filtrate 75 from filter 70), which contains caustic with small amounts of dissolved alumina. The Na-aluminate solution can have a concentration of anywhere from 5%–22% $Al_2O_3$. The slurry of water or mother liquor and ATH is typically heated for 15–20 minutes to dissolve some of the ATH powder. In some commercial-scale processes, some fraction of the alumina (for example, approximately 15–20%) may remain undissolved in this solution as alumina trihydrate. Where some fraction remains undissolved, the sodium aluminate material may be more properly termed a mixture; if all the alumina trihydrate dissolves, the mixture is referred to as a solution. As used herein, the term "mixture" refers to both solutions where all the soluble alumina is dissolved and mixtures where some undissolved alumina remains. The term sodium silicate mixture is also used herein to refer to solutions and mixtures.

When aluminate is prepared in bulk, it is frequently the practice to meter the requisite quantity of analyzed solution into a batch feed tank 20. A silicate batch feed tank 30 can similarly be supplied with a requisite quantity of soluble silicate solution of a specific composition. Alternatively, the soluble silicate of known composition can be supplied by a larger silicate storage tank (not shown). Soluble silicate for this purpose can be prepared by the dissolution of sodium silicate glasses in water or dilute solutions of NaOH by procedures well known in the art. Such silicate solutions can also be purchased from commercial suppliers. The sodium silicate solution may be mixed in a ratio of between 1.0–3.8 $SiO_2/Na_2O$ at 150° F.

The sodium aluminate mixture and sodium silicate solution may then be pumped directly into crystallizer 60, or optionally into gel mix tank 40 (described below). The sodium aluminate and sodium silicate streams may be fed sequentially or simultaneously into the mixing vessel through dedicated lines, or the streams may be mixed in-line, such as with a jet mixer, prior to being fed into the mixing vessel. The combination of soluble silicate and aluminate solutions typically generates an amorphous gel-like precipitate such that the slurry viscosity increases substantially. This viscosity diminishes over time and with heating. The high viscosity requires powerful agitator motors to effect mixing of the reagents. Thus, a separate mix tank 40 with powerful agitiation is sometimes supplied for the purpose of overcoming this initial high viscosity. Alternatively, the reagents can be mixed directly in crystallizer 60. Crystallizer 60 typically is equipped with baffles and agitators. Agitation and mixing of the ingredients is typically effected by means of one or more turbine paddles with pitched blades, and the tank itself is equipped with baffles to promote a high degree of turbulence.

Optionally, the gel can be held or "aged" in an aging tank 50 between gel mix tank 40 and crystallizer 60 for some period of time up to several hours at temperatures below the normal temperature of crystal growth to promote greater homogeneity and the formation of zeolite nucleii or precursor species. This treatment is believed to promote diffusive blending of the reactive ingredients and is known in the art to favor the formation of larger numbers of zeolite nucleii or precursor species in the gel mixture. Increased numbers of crystal nucleii generate smaller crystals in the product. An alternative is to provide small amounts of a "seed gel" containing nucleii or pre-cursor species that are able to generate nucleii in sufficient numbers to effect a significant reduction in crystal size of the product. One such "seed gel" is disclosed in U.S. Pat. No. 3,808,326 as a "precursor mixture" for adding to synthesis compositions designed to produce the faujasite type zeolites, X and Y.

Crystallization of the gel mixture is carried out by a conventional process in which the gel is heated at temperatures between 80–100° C. for some period of time until the slurry solids are fully crystalline as determined by comparison of a carefully made X-ray diffraction (XRD) scan with a reference scan of material known to be fully crystalline. The time required for crystallization is strongly dependent upon temperature with higher temperatures favoring more rapid crystallization. For equivalent formulations, a lower temperature favors crystallization of smaller crystals and particles over longer times while higher temperatures favor faster crystallization of larger crystals and particles.

After the crystallization step, a flash step may be performed to cool the mixture prior to filtration. Such a flash step may comprise placing the mixture under vacuum to flash off water vapor, thus cooling the mixture. The flashed-off water vapor may then be condensed and used as de-ionized water in the subsequent filtration step.

The crystalline product is separated from the mother liquor by filtration using various standard filtration processes and equipment including belt filters or filter presses 70. The product is washed with an appropriate amount of water, such as the de-ionized water created in the flash step described above, to displace residual mother liquor so as to give consistent properties meeting specifications for the dried product. The filtrate liquid 75 consisting of the crystallization mother liquor contains un-utilized reagent values in the form of soluble $Na_2O$ and $Al_2O_3$ or $SiO_2$. These values can be recovered by recycle of the mother liquor as is or after appropriate evaporation of excess $H_2O$ so as to maintain water balance in the manufacturing process. In the case of crystallization of zeolite A (with $SiO_2/Al_2O_3$=2.0) synthesis formulations having gel $SiO_2/Al_2O_3$ mole ratios<2.0 invariably generate a mother liquor which contains excess $Al_2O_3$ rather than $SiO_2$.

Filter cake 77, which comprises approximately 60–65% solids, is dried in a dryer 80 by conventional methods for fine powder drying to an LOI in the range 18–24 weight percent. Conventional drying methods include various continuous methods including flash drying or spray drying as well as batch drying in ovens. For example, a ring dryer run with a 190° F. outlet temperature may achieve the desired result. The zeolite powder may then be captured in standard solid/gas separation equipment known in the art, such as a baghouse (not shown). The zeolite powder is then typically transferred to storage silos 90 from which the product can be transferred to, for example, bags, supersacks, trucks, or railcars.

The bulk chemical reaction for making zeolite A by this exemplary batch process essentially comprises mixing together alkaline aqueous solutions of sodium silicate and sodium aluminate to form amorphous aluminosilicate gels which are heated for a time and converted to a crystalline aluminosilicate with an ideal anhydrous oxide composition of: $2SiO_2.Al_2O_3.Na_2O$, having a characteristic x-ray diffraction pattern and commonly referred to as sodium zeolite A, zeolite A, 4A, or LTA.

It is common in zeolite A synthesis, though not essential, to use a batch formulation containing less than the stoichiometric amount of $SiO_2$ required for the product composition. In such formulations, $SiO_2$ is the limiting reagent so that the separation of product solids leaves the solution phase mother liquor containing some small amount of dissolved $Al_2O_3$ together with significant concentrations of $Na_2O$ and negligible (ppm) amounts of soluble $SiO_2$. While ordinary synthesis procedures generate a product that has an analytical composition very close to the ideal stoichiometry, compositions can also be synthesized that have both higher and lower mole ratios of $SiO_2/Al_2O_3$ and $Na_2O/Al_2O_3$, detected by careful chemical analysis, which yet exhibit essentially the same x-ray diffraction pattern. Such composition variations can be obtained through either inadequate or excessive washing of the product to free it of retained synthesis liquors, or due to genuine differences arising from the incorporation of more $SiO_2$ in the crystal framework or the occlusion of Na-silicate or Na-aluminate species within the crystal structure of ideal composition.

In conventional batch methods of Na-A synthesis, combination of Na-silicate and Na-aluminate solutions results in the formation of a highly viscous gel phase. This gel viscosity increases with solids content in the slurry so that solids content, and hence batch yield, is subject to practical limitations due to the exponential increase in cost for agitation equipment that will provide the requisite degree of mixing needed to get good heat transfer and combination of reactants. Forming less-viscous gels allows higher solids formulations to be used, increasing yields in the same equipment and reducing the unit cost of manufacture accordingly. Other methods of increasing yields or reducing batch cycle time also contribute to lower unit manufacturing costs. In batch manufacturing processes, a targeted increase in the scale of production typically requires a linear increase in capital equipment, including building space to house that equipment.

It is therefore particularly advantageous and desirable to provide manufacturing procedures that allow significant expansion of batch yield using existing capital equipment, or which require manufacturing capacity expansion in only a part of the series of unit operations. The process improvements of this invention allow the implementation of such strategies to improve the yield of existing manufacturing facilities substantially with only minimal capital investment.

SUMMARY OF THE INVENTION

The present invention comprises zeolite products having improved properties as a result of novel modifications to the standard zeolite synthesis process. One embodiment of this invention comprises zeolite A with superior Ca ion exchange properties such that the zeolite can be used in cold water detergent washing formulations without a water softening performance penalty. A second embodiment of this invention comprises zeolite A and X mixtures that provide the enhanced water softening performance in the presence of high Mg. The X product in such A/X mixtures may be a low silica variety (sometimes referred to as LSX) that has nearly the same chemical composition and total ion exchange capacity as zeolite A. Thus, the use of the A/X mixtures of this invention incurs a negligible penalty in reduced total ion exchange capacity per unit weight of zeolite powder.

The synthesis of either the pure A or A/X mixtures of this invention can be accomplished in a commercial manufacturing process without changing existing reagents or using additional reagents and even without changing the proportions of oxide components used in the synthesis formulation. Thus, existing manufacturing facilities can supply a more varied product to meet customer-specific requirements without changes in materials inventory, synthesis equipment, or material balances that may affect recycle operations within the facility.

The superior exchange properties of the zeolite of this invention are evidenced most clearly in terms of their cold water (10° C.) Ca exchange performance. Values obtained from the measurement of Ca exchange rate (CER) are dependent upon the conditions and method of measurement including composition and concentration in test solutions. This is partly true of measurements of Ca exchange capacity (CEC). For this reason it is best to compare the performance of the improved zeolite exchange product with a typical commercial product such as VALFOR® 100 (manufactured by the PQ Corporation of Valley Forge, Pa.) under precisely the same experimental conditions. When the products of this invention are compared with representative samples of VALFOR® 100 we find an improvement in the CER values in a range from 15 to 50 percent. Typical VALFOR® 100 gives 2-minute CER values at 10° C. in the range 160–170 up to about 190 mg of $CaCO_3$ per gram anhydrous zeolite in the best quality material. The zeolite A of this invention, measured under identical circumstances, has a 2-minute CER in cold (10° C.) water of greater than about 200, preferably greater than 220 and most preferably equal to or greater than 250 mg $CaCO_3$/g anhydrous zeolite. The calcium exchange capacity (CEC) at 15 minutes in cold water is greater than about 250, preferably greater than about 260 and even as high as 300, milligrams of $CaCO_3$ per gram of anhydrous zeolite. The corresponding CEC value for VALFOR® 100 in cold water is on the order of 250 mg $CaCO_3$ per gram anhydrous zeolite.

Zeolite powders of this invention have a median particle size in the 1–5 micron range and most preferably in the 2–4 micron size range. VALFOR® 100 typically has a somewhat larger mean particle size in the range 4–5. Crystal sizes of the zeolite of this invention are fairly uniform in a range from about 0.2–0.8 microns and most preferably around 0.5 microns or slightly less. Some useful control of both particle and crystal size can be exercised by small adjustments of synthesis conditions especially with respect to reducing the larger particle size fraction in the distribution. Crystal size distribution is conspicuously smaller and more narrow than the distribution of crystal sizes observable in VALFOR® 100 by electron microscope examination. Bulk density typically falls in a range from about 0.19 to 0.35 g/milliliter.

A remarkable and unexpected feature of the product of this invention is that the external surface area of the zeolite crystals is significantly greater than the external surface area measured on a commercially available detergent zeolite such as VALFOR® 100. Moreover, when a calculation is made of the equivalent spherical diameter (ESD) for uniformly sized particles of the same intrinsic density having the identical specific surface area ($m^2$/g) we find that this dimension is plausibly close to the measured particle size of the commercially available zeolite, but that the ESD calculated for the product of this invention is very much smaller than both the measured median particle size and the individual crystal size of the product. This high surface area property appears to be a direct consequence of the process of making the zeolite of this invention. Furthermore, while it is expected from the teachings of prior art that Ca exchange rates should increase as zeolite particle size decreases, we have found a negligible correlation of exchange rate with either particle or crystal size, but have found instead that the 10° C. CER of the zeolite A of this invention is directly related to the external zeolite crystal surface area as measured by nitrogen adsorption using the well known B-E-T method. Specifically, the invention comprises a zeolite product comprising zeolite A having an external surface area greater than about 5 $m^2$/g as measured by a B-E-T nitrogen adsorption method at the boiling point of liquid nitrogen. The increased surface area found in the product of this invention is equivalent to the area that would be generated by particles of uniformly sub-micron size. Such small particles would be prohibitively expensive to manufacture by synthesis techniques known in the art because of requirements for more costly reagents, lower yields, and difficulty in solids separation, recovery, and washing. The particles of this invention, however, are greater than about 1.9 microns, and preferably greater than about 3 microns in size, avoiding the problems inherent in small particles.

The ability of powders to absorb liquids while retaining powder flow properties is important in the formulation of powder detergents where active ingredients are often liquid materials. Liquid carrying capacity (LCC) is the weight of test liquid that can be taken up by 100 grams of powder without causing agglomeration of the powder to form a paste. The materials of this invention have, as another consequence of their altered morphology, improved liquid carrying capacity (LCC) when compared to a more conventional product of current commerce. Materials with a liquid carrying capacity substantially greater than 50 and even up to 100 may be prepared. LCC values are conveniently expressed as grams of liquid taken up or "carried" per 100 grams of the as-is zeolite (hydration water included). This valuable property enhancement appears to be directly caused by, or at least strongly associated with, the same physical and morphological changes that appear to give the product of this invention enhanced ion exchange performance.

The present invention also provides a process for making the zeolite product. The process comprises mixing a sodium silicate solution, a sodium aluminate reagent mixture, and an amorphous aluminosilicate initiator or "seed" gel in a mixing vessel to create an aluminosilicate synthesis gel and crystallizing said synthesis gel to form zeolite crystals. The process comprises adding the sodium aluminate reagent mixture to the sodium silicate solution preferably at a gradual rate such that the addition of the full charge of aluminate reagent requires longer than 20 minutes. Agitation during the aluminate addition is preferably vigorous to ensure a high degree of turbulent blending. Longer addition times up to 60 minutes can be beneficial but at increasing penalty in terms of process cycle time. The sodium aluminate reagent mixture may consist of a fully dissolved solution of alumina in NaOH or, advantageously, a slurry mixture in which a percentage of the total batch alumina is present in the form of a soluble aluminum oxide or hydroxide powder such as the alumina trihydrate (gibbsite, hydragillite).

The amorphous aluminosilicate initiator gel may be added before, after, or during the addition of the sodium aluminate to the mixing vessel, including adding the initiator gel to the sodium silicate solution prior to mixing with aluminate. The weight of alumina (expressed as $Al_2O_3$) added in the amorphous aluminosilicate initiator ("seed") gel preferably comprises about 0.01 to about 2.0 weight percent of the total batch alumina, and more preferably, about 0.1 to about 1 weight percent.

Instead of, or in addition to, the gradual addition of the sodium aluminate mixture, the process using an initiator gel may further advantageously comprise adding a percentage of the batch alumina as alumina trihydrate powder. When the percentage of the total batch alumina added as alumina trihydrate powder comprises less than a limit point (about 35 weight percent in one set of conditions), the resulting zeolite product comprises almost entirely zeolite A. When the percentage of the total batch alumina added as alumina trihydrate powder comprises greater than about 35 weight percent, the resulting zeolite product comprises a mixture of zeolite A and zeolite X. In general, under a single set of synthesis conditions, the greater the fraction of alumina added as alumina trihydrate powder, the higher the percentage of the zeolite product as zeolite X. Thus, a zeolite product having a wide range of ratios of zeolite A to zeolite X can be made by varying the amount of alumina added as alumina trihydrate powder in a given composition. It will be appreciated by those skilled in the art of zeolite synthesis that the particular proportions of A and X formed in the mixed phase product will also depend on other parameters of the synthesis and the proportions of other synthesis components even with a fixed fraction of undissolved alumina. Changes in solution alkalinity and agitation, shift the concentration and composition of solute species and the rates of dissolution for both the gel phase and the alumina solids. Typically, these factors must be evaluated empirically for particular process compositions and configurations. The process of this invention allows significant flexibility in any existing manufacturing process to produce, in the same equipment, either pure A zeolite or variable mixtures of zeolites A and X to meet the specific needs of customers with no change in the basic quantities and proportions of synthesis ingredients, but only by varying the relative proportion of dissolved and undissolved alumina in the formulation.

In the investigation of the process of this invention we have further discovered that a superior quality pure zeolite A phase can be made under conditions similar to those just described for the synthesis of A/X mixtures. When similar gel compositions containing variable, large, proportions of undissolved alumina are prepared without the addition of the initiator ("seed") gel the synthesis product consists of a pure zeolite A phase having a uniform small particle size with a significantly more narrow size distribution. Compositions with greater than 22 weight percent, preferably greater than 30 weight percent, more preferably between about 35 to about 90 weight percent, and even more preferably between about 60 to about 90 weight percent of the batch alumina present in undissolved form produce zeolite A product in systems that generate A/X mixtures in the presence of an initiator gel.

The invention further comprises zeolite A or a mixture of zeolite A and zeolite X made by the above processes, and detergent compositions containing zeolites made by the above processes. Such detergent compositions comprise from 0.1% to 99% of a builder system comprising the zeolite product of this invention, and optionally, a auxiliary detergent builder salt, and from 0.1% to 99% of by weight of at least one detergent adjunct other than the builder system.

The invention further comprises a process for increasing manufacturing throughput of existing equipment in a zeolite production facility. The process comprises adding an excess amount of undissolved soluble alumina well above the amount required to react with the amount of silicate added in the initial gel batch make-up. In this process the excess alumina dissolves rapidly during and after completion of a first crystallization stage and generates a zeolite A slurry in an alumina enriched liquor. The subsequent addition of an appropriate stoichiometric amount of concentrated soluble silicate to this slurry results in the rapid generation of additional zeolite with essentially no increase in synthesis cycle time. We have found that it is beneficial not to supply the exact stoichiometric amount of silica to react with all the available alumina in the mother liquor composition, but instead to limit the amount of added silicate so as to form a zeolite A with the typical composition $2.0SiO_2 \cdot Al_2O_3 \cdot Na_2O$, leaving sufficient dissolved $Al_2O_3$ in solution to give a mother liquor $Na_2O/Al_2O_3$ mole ratio less than about 60 and preferably about 20 to about 40. At higher ratios it appears that the hot, alkaline, mother liquor solution attacks the zeolite causing damage and degradation of properties, or else promotes the dissolution of the zeolite, forming an aluminosilicate that precipitates amorphous material on the product as the zeolite mother liquor cools slowly during downstream processing.

The process of this invention provides significant flexibility for existing manufacturing facilities in that both performance qualities and material handling properties of zeolites useful for detergent applications can be controlled and optimized with minimal or no requirement for additional capital investment, change of overall composition, or the introduction of new and more costly reagents.

The products of this invention have the remarkable quality of exhibiting the ion exchange rate behavior expected of very fine particles, while at the same time they maintain a particle size distribution and material handling properties more characteristic of conventional zeolite powders. For the zeolites of this invention, we have found that the exchange rate is dependent not upon the particle or crystal size of the zeolites but is strongly correlated with the external surface area of the zeolite particles. Zeolites of this invention have exceptionally large external surface areas as compared with more conventional zeolites prepared by the methods of prior art. The high surface area of the zeolite A of this invention appears to be due to a combination of factors in the particular procedures used in their synthesis.

DETAILED DESCRIPTION OF THE INVENTION

Figure 1:
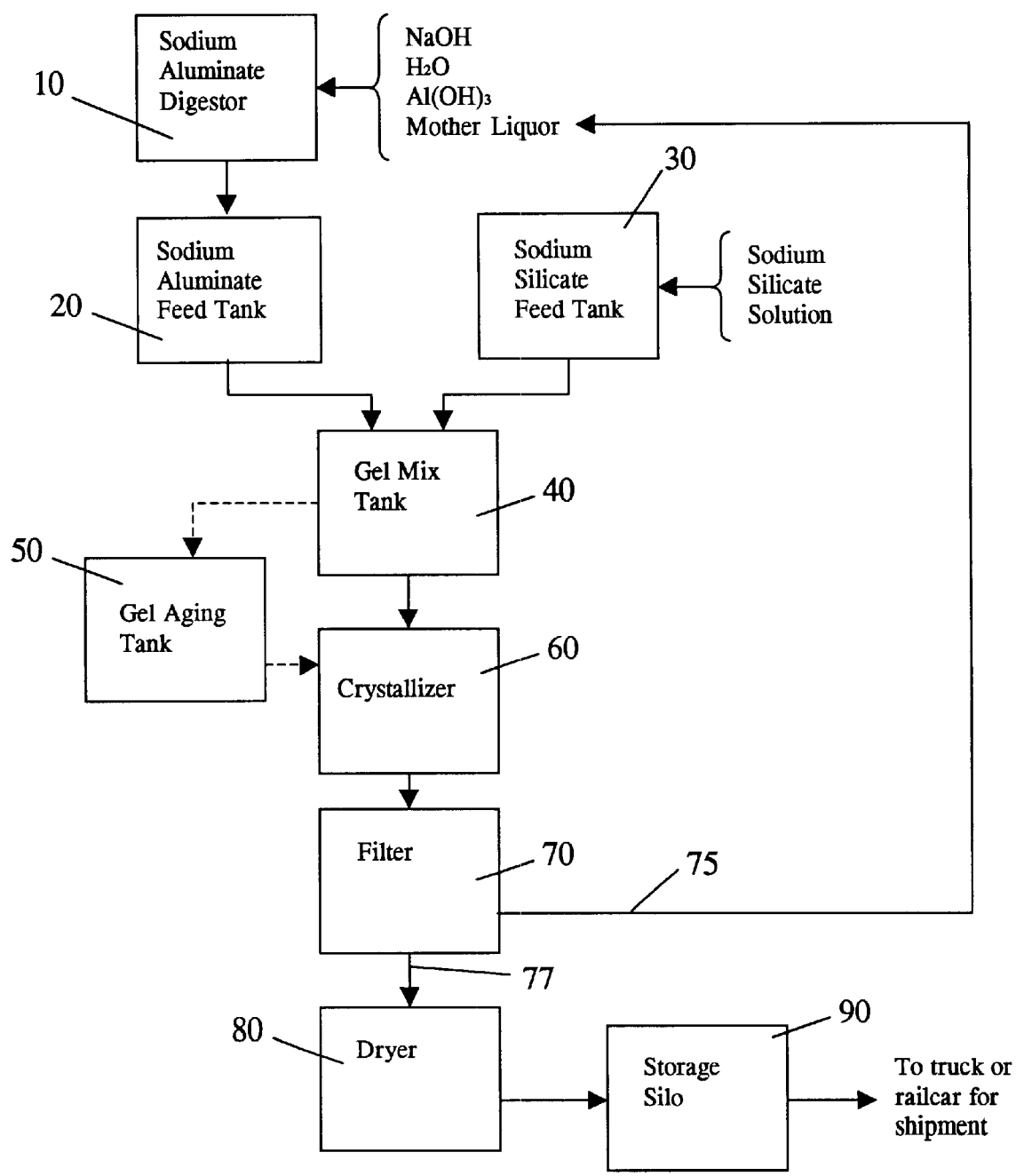
FIG. 1 is a schematic diagram of an exemplary zeolite synthesis process according to the prior art.

The invention will next be illustrated with reference to the figures wherein similar numbers indicate the same elements in all figures. Such figures are intended to be illustrative rather than limiting and are included herewith to facilitate the explanation of the methods and products of the present invention.

One aspect of the process according to the present invention is directed towards the manufacture of zeolite materials with exceptionally high rates of $Ca^{2+}$ and $Mg^{2+}$ ion exchange even in cold (10° C.) water. It is known in the art that decreasing the size of zeolite particles enhances the rate of ion exchange in vigorously stirred systems because the rate limiting step in this exchange process is believed to be the diffusion of ions from the zeolite/solution interface to exchange sites within the particle. When the particles and crystals are large, the slowest diffusion process occurs within the crystal, but as the particle and crystal size is made smaller, and diffusion paths within the zeolite become shorter, the exchange rate should eventually be dominated by the diffusion rate of ions through a static liquid boundary layer at the zeolite solution interface. See R. P. Townsend in "Studies in Surface Science and Catalysis: Introduction to Zeolite Science and Practice" vol. 58, H. Van Bekkum, E. M. Flanigen, J. C. Jansen, Elsevier Amsterdam,(1991) ch. 10 p. 377. Thus it is recognized in the art that decreasing the particle size of zeolites should result in improved rates of ion exchange. The manufacture of zeolite A consisting of smaller and more discrete particles, however, becomes progressively more difficult and expensive. The formation of discrete, small particles of zeolite may require dilute synthesis gels with low yields or the use of more expensive silica reagents. Recovery and washing of particles with a median particle size near one micron or less is extremely difficult using conventional equipment without flocculating agents. The product of this invention exhibits the ion exchange performance characteristics that might be expected for an ideal product of uniformly sub-micron particle size, in a material with particle size and material handling properties that are not very different from those of existing commercial product; thus the process of producing this product is entirely suitable for commercial implementation using conventional and existing plant equipment.

The process according to the present invention, similar to the prior art, consists of mixing a sodium aluminate mixture with a sodium silicate solution and crystallizing the zeolite product. Surprisingly, however, it has been found that a combination of factors in the formulation and preparation of the synthesis mixture results in a zeolite A product with a particle size and distribution similar to commercial product but with greatly enhanced ion exchange performance, particularly in cold water.

The combined factors leading to this improved product include a gel make-up procedure that favors the generation, in a typical zeolite A synthesis composition, of a primary gel solid phase that is substantially silica rich as compared with the zeolite A product and the use of an initiator or "seed" gel to promote the formation and rapid growth of small crystals. The combined action of these factors results in a rapid crystallization of zeolite A in the form of conventionally sized zeolite particles comprised of inter-grown small crystals. The product obtained in this way is filtered and washed to remove strongly alkaline synthesis liquors. Conventional filtration equipment such as filter belts and filter presses can be used for this purpose with no requirement for extraordinary measures to avoid losses of ultra-fine material. The filter cake can be dried in ring or flash dryers, the configuration and operation of which are well known in the art. Preferred dryers and operating configurations promote break-up of the weak agglomerates that typically form in wet and compressed filter cakes.

The starting materials for synthesis of this product may be any highly reactive silica and alumina reagents. Preferred silica reagents by reason of their lower cost are any of the variety of soluble sodium silicate solutions of commerce which are known and used in the art to prepare zeolites. For example soluble sodium silicates having $SiO_2/Na_2O$ mole ratios ranging from 1 to 4 can be used and commercial silicate solutions or sodium silicate glass of one particular ratio can be combined with NaOH or NaOH solutions to generate solutions with lower ratio as is known in the art. Silicate solutions having a $SiO_2/Na_2O$ mole ratio of about 3.3 (commonly known as "waterglass" solution) are generally available at relatively low cost and consist of a mixture of mono and polymeric silica species. Used as such this reagent favors the formation of a silica-rich primary gel when a reactive aluminate solution is slowly added to it. Reactive amorphous silica powders may also be used but such reagents, prepared by acid precipitation from sodium silicate or generated as residual solids by the acid extraction of Al from clays, are usually too costly for detergent zeolite manufacture. An aluminate reagent can be prepared by combining any reactive alumina or aluminum hydroxide (alumina trihydrate) with NaOH and water or by reacting a soluble aluminum salt with excess NaOH in solution. Solid sodium aluminate can also be purchased and dissolved in water as such or in combination with NaOH. It is not necessary that all the alumina in the alumina reagent be fully dissolved. We have found that it can be advantageous for some part of the alumina reagent to remain undissolved, for example as crystalline alumina trihydrate, in the aluminate mixture.

The amorphous aluminosilicate initiator gel may be any initiator or "seed" gel known in the art for making zeolite X or Y that is fluid in character and readily dispersible in a gel mixture. In particular, the initiator gel may have an empirical composition of approximately $15SiO_2.1Al_2O_3.16Na_2O.300H_2O$. An exemplary process for making such an initiator gel is described in more detail in U.S. Pat. Nos. 3,574,538; 3,808,326; and 4,340,573, assigned to W. R. Grace, and incorporated herein by reference. Such gels prepared at ambient temperature from fully soluble silicate and aluminate are typically aged for periods of time ranging from about 4 hours to more than 24 hours before their use in synthesis. The ability of such initiator gels to promote nucleation and growth of either the LTA or the FAU structure suggests that nuclei or at least nuclear precursor species of both types are likely generated in the gel during the aging period. The amount of initiator gel added is typically expressed as a weight percentage of the batch alumina, which is the weight of alumina (expressed as $Al_2O_3$) added via the amorphous aluminosilicate initiator gel divided by the total weight of alumina used for making the zeolite batch. For the process of the present invention, the alumina added via the initiator gel is preferably in the range of 0.1%–2% weight percent of the total batch alumina. Percentages outside of this range may also be used, but lower amounts are generally less effective and the benefit of larger amounts becomes marginal in the reactive gel systems required in this invention.

The general process of this invention may be optimized in a number of ways. For example, while in principle the optimum rate of sodium aluminate addition is indefinitely slow, there are practical limits to the utility of prolonging this step in commercial practice. Addition intervals greater than 20 minutes are preferred and a 30–40 minute addition time is usually satisfactory. Vigorous agitation is desirable during aluminate addition to ensure immediate dispersion of the aluminate in the silicate solution and the general absence of localized volumes of concentrated aluminate. Gel forms shortly after the addition of the aluminate solution to the silicate begins, under conditions in which the system composition is still silica-rich, so that the gel solids necessarily have a high $SiO_2/Al_2O_3$ mole ratio.

Slow aluminate addition to silicate ensures that much of the gel phase that first forms (primary gel) has a $SiO_2/Al_2O_3$ mole ratio that is greater than 2.0. Under this condition, direct conversion of the primary gel particles to zeolite A is not favored. When a large part of the silica is precipitated as a silica-rich aluminosilicate, before completion of alumina addition, the final solution phase composition at the end of such a gel make-up is relatively enriched in soluble alumina and caustic. Because the large primary gel particles are silica-rich, they tend not to convert directly to large intergrown particles of zeolite A, but are instead acted upon by the alkaline liquors to re-disperse during the crystallization process, favoring the formation of more discrete crystals or smaller agglomerates of zeolite A. Conversely, the addition of silicate to aluminate results in the entrainment of aluminate, forming large primary gel particles with a composition appropriate to zeolite A. Multiple nucleation events within such gel particles result in the formation of large, robust, polycrystalline A agglomerates. Generation of a silica-enriched primary gel phase can also be brought about effectively by providing some of the requisite alumina for the batch formulation in the form of undissolved solids. For example, when 20 percent or more of the batch alumina is provided as undissolved alumina trihydrate this alumina is unable to participate in gel formation by reaction with soluble silicate of any kind, so that the effective $SiO_2/Al_2O_3$ mole ratio at any total composition is increased by a factor of 1/0.8 or 25 percent. With a substantial fraction of undissolved alumina present, the silicate and aluminate reagents can be combined simultaneously in stoichiometric proportion so long as the combining proportions of soluble silicate and soluble aluminate continue to have a mole ratio greater than 2.

In the process of gel make-up both the sodium aluminate and sodium silicate solutions may be relatively cool (less than 100° F. (38° C.)) prior to and during combination. It is known in the art that forming a zeolite A gel at low temperatures and holding the gel at this temperature for a period of time ("aging") favors the formation of smaller crystals when the gel is subsequently heated to crystallization temperature. This low temperature mixing and aging treatment does not appear to be necessary to achieving beneficial results when an initiator gel is used in the process of this invention. The initiator gel composition can be added to the silicate reagent before gel make-up or to the silicate during gel make-up or to the aluminosilicate gel mixture after make-up with apparently equal effect. After all of the reagents have been added together, the mixture is heated rapidly to a crystallization temperature in the range of 90–100° C. (194–212° F.), preferably 95° C. or greater, in order to effect rapid crystallization over a period of 0.75 to 1.5 hours. Heating to temperature can be accomplished by methods known in the art including steam sparging, heating of vessel walls or pumping the gel through a heat exchanger. Progress of the crystallization is monitored by x-ray diffraction analysis and comparison of selected peak areas or intensities with fully crystalline standards. As in standard zeolite processing, after crystallization, the zeolite is filtered, washed, and dried. Upon determination that crystallization is complete (>95% of standard) it is desirable that the product solids be promptly cooled by a water quench or by heat exchangers or separated from the mother liquor by filtration. It is known generally in the art that over-digestion of the zeolite in its liquor can promote the formation of undesirable crystalline impurity phases or be otherwise detrimental to zeolite performance in ion exchange applications.

The sodium aluminate reagent added to the sodium silicate solution may consist of fully dissolved alumina in caustic solution or the reagent may be a slurry mixture containing widely variable amounts of undissolved alumina trihydrate. The alumina trihydrate that normally would be undissolved in the aluminate solution may instead be added to the crystallizer directly as a powder. The alumina trihydrate powder can be added to the make-up vessel containing soluble silicate prior to adding the sodium aluminate solution or to the aluminosilicate gel containing the initiator either in a make-up vessel or in the crystallizer itself. One advantage of adding the alumina trihydrate to the made-up gel composition rather than to the aluminate is that the fraction of undissolved alumina is better defined in the former case and is independent of the contact time with the caustic aluminate solution. This favors a manufactured product with a more consistent morphology and particle size distribution.

It has been found that when the percentage of the total alumina added directly to the crystallizer as alumina trihydrate powder comprises no more than about 30 weight percent of the batch alumina, the zeolite product made by the process is consistently phase pure zeolite A, as shown by Example 3. By this it is meant that the resulting zeolite product contains greater than approximately 95% zeolite A (the range of resolution using typical x-ray diffraction instrumentation) and is free of x-ray detectable crystalline impurity phases such as zeolite X, and any of a variety of dense phase zeolites such as sodalite or cancrinite, or undissolved alumina trihydrate. Surprisingly, under some synthesis conditions, when the percentage of total batch aluminum added as alumina trihydrate powder comprises greater than or equal to about 35 weight percent of the batch aluminum, the zeolite product made by the process comprises a mixture of zeolite A and zeolite X, as shown by Example 5. Those skilled in the art will understand that this limit point for the fraction of undissolved alumina required to trigger the transition from pure A zeolite to A/X mixtures will be somewhat variable depending upon the overall stoichiometric composition of the gel mixture including nominal $SiO_2/Al_2O_3$, $Na_2O/SiO_2$ and $H_2O/Na_2O$ mole ratios, the process of gel make-up, degree of agitation, and crystallization temperature. We have discovered as well that the use of an initiator gel is also essential. For a given gel composition employing an initiator, the percentage of zeolite X formed in the crystallization increases as the percentage of aluminum added as alumina trihydrate increase beyond some critical minimum amount.

The larger pores of zeolite X are known to effect a more rapid rate of $Mg^{2+}$ (and $Ca^{2+}$) exchange. As can be appreciated, a hybrid zeolite product mixture having a strong, specific, affinity for adsorbing both calcium and magnesium can be provided based on the relative proportions of zeolite A and zeolite X in the product and using the same manufacturing process and raw materials. Detergent customers can thus be supplied with a product in which the zeolite builder composition is tuned for optimum performance under local conditions with varying content of magnesium and calcium in the water.

Zeolite X is typically formed in synthesis systems in which the overall gel composition has a $SiO_2/Al_2O_3$ mole ratio greater than 2.5 and ranging as high as 5. The formation of A/X mixtures by the processes of this invention may be due both to the relative inactivity of the undissolved alumina and to the use of an initiator gel that is known to promote nucleation of zeolites X and Y. Because of the inactivity of the undissolved alumina, the effective or "virtual" gel composition during the initial stages of synthesis has a significantly higher $SiO_2/Al_2O_3$ mole ratio than the nominal composition. In these terms, when 40 percent of the alumina is undissolved, a nominal gel composition with $SiO_2/Al_2O_3$ of 1.9:1 has the "virtual" composition of 1.9/(1−0.4) or 3.17. This, at least, is the case during the initial stages of gel crystallization, wherein viable crystal nuclei of both kinds begin to grow. As the alumina solids continue to dissolve during digestion the mother liquor is continually enriched with soluble alumina. In the presence of initiator gel and at an appropriate virtual composition both A and X nuclei grow in an progressively more Al-rich mother liquor that favors a composition for both crystal phases having a $SiO_2/Al_2O_3$ mole ratio which approaches 2.0 as a limit. A conventional zeolite X powder with a framework $SiO_2/Al_2O_3$ of 2.5 would have a maximum exchange capacity of 6.37 meq/g whereas zeolites A or X with $SiO_2/Al_2O_3$ of 2.0 would have a total exchange capacity of 7.04 meq/g. Thus the process of this invention advantageously supplies A/X mixtures having an exchange capacity close to values obtained from zeolite A with $SiO_2/Al_2O_3$ of 2.0.

An experiment was conducted (Example 9) using the same nominal stoichiometry with 60 percent of the batch $Al_2O_3$ added as alumina trihydrate, but with no initiator. In this instance the batch crystallized in one hour at 95° C. to form pure zeolite A with possibly a trace of zeolite X but no trace of undissolved alumina trihydrate. Remarkably this product showed the best exchange performance of all products of this invention with a 2 minute, cold water, Ca exchange (CER) value of 272. This value is 51 percent better than a commercial sample of VALFOR® 100 (CER=180). Further experiments showed that A was still the preferred product of this synthesis even when the undissolved $Al_2O_3$ fraction was increased to 70 and 80 percent.

We interpret this surprising result as giving strong evidence that the species present in the initiator gel likely simultaneously include nuclei or nuclear pre-cursor species that are specific to the formation of either LTA or FAU crystal structures, but in the absence of species uniquely supplied by the initiator gel, such synthesis systems nucleate only the LTA structure under the conditions disclosed. The product of this invention exhibits cold water $Ca^{2+}$ exchange properties far superior to standard, commercially available products such as VALFOR® 100.

Without being limited to any particular theory, it is believed that superior cold water Ca exchange properties may be due in part to the small particle size and narrow particle size distribution of the product as well as to the fractal morphology suggested earlier. It is theorized that when a substantial fraction of the batch alumina is inactive, less gel is produced and the gel that forms is effectively more dilute than would be the case if all $Al_2O_3$ were dissolved. The dissolution of $Al(OH)_3$ solids consumes caustic in the synthesis system:

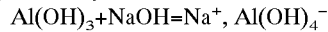
$Al(OH)_3 + NaOH = Na^+, Al(OH)_4^-$

With a substantial fraction of undissolved alumina in the formulation, more free caustic is therefore available in the solution phase to attack, dissolve, and disperse the gel that is present. Gel that does form is likely to be silica-rich and hence more susceptible to dissolution in caustic. Indeed, for gel compositions with an overall $SiO_2/Al_2O_3$ of 1.9/1, the presence of 60 percent of the total $Al_2O_3$ as undissolved alumina trihydrate results in an active gel with the initial virtual composition of 1.9/(1−0.6)=4.75. Similarly, the virtual $Na_2O/Al_2O_3$ ratio becomes 3.4/(1−0.6)=8.5, an increase of 250 percent in the initial gel. With 60 percent of the alumina inactive, the initial aluminosilicate gel phase that forms has, for the most part, a mole $SiO_2/Al_2O_3$ ratio greater than 3, so that large gel particles of this composition are slow to convert directly to large inter-grown aggregates of zeolite A, but instead remain as amorphous gel undergoing chemical or mechanical dispersion in the agitated system or gradual dissolution so as to form smaller particle crystalline material. When much of the batch alumina remains undissolved, less gel is formed and viscosity in the reaction mixture is reduced, so that it is possible to increase the solid content and batch yield significantly.

The products of this invention can be made successfully by sequential addition of aluminate to silicate at ambient temperatures or at elevated temperatures or by simultaneous addition directly to a mixing vessel or via a static in-line mixer or by means of a "jet" mixer blending high velocity, turbulent, feed streams. For simultaneous addition using solutions it is preferable to combine reagents disproportionately so as to favor the initial formation of a silica rich gel phase. Combination of soluble reagents at low temperature appears to result in enhanced levels of ion exchange performance even with the use of initiator but with disadvantageous manufacturing qualities in terms of cycle time, processing and material handling. Hot mixed gels, containing initiator, typically allow savings in energy costs, cycle times, and improved handling properties while still providing dramatically superior exchange performance in comparison with conventional product.

Figure 2:
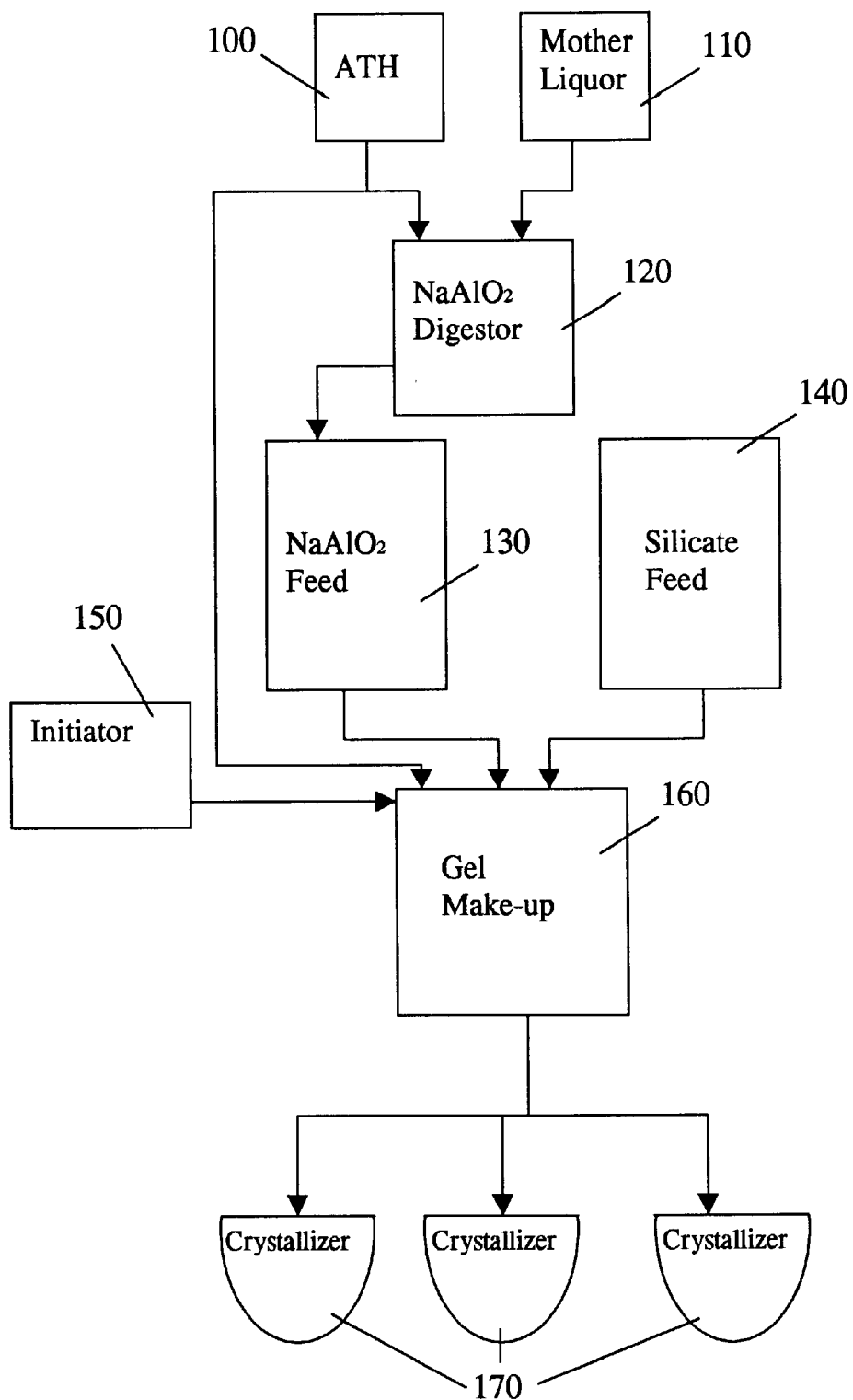
FIG. 2 is a schematic diagram of an exemplary process of the invention.

A schematic process flow diagram of an exemplary process of this invention is shown in FIG. 2. The sodium aluminate is preferably made-up in digester 120 with only an amount of ATH 100 that can be fully dissolved in the hot mother liquor solution 110. At least 20–30 percent of the total batch alumina needed to make the zeolite is reserved according to an embodiment of the present invention. This reserved ATH is added later in the gel make-up tank 160 as a powder. Up to about 20–30% of the ATH can be reserved from the aluminate make-up and still allow the successful crystallization of nearly all zeolite A. At about 35% and above, the crystalline product contains (or begins to contain) noticeable amounts of zeolite X. The aluminate solution prepared in this way contains no suspended solids and can be used hot or stored stably in a large volume holding/feed tank 130 where it can be analyzed for accurate composition and maintained at an elevated temperature or allowed to cool prior to use.

Aluminosilicate synthesis gels are made up by combining the sodium aluminate, for example from feed tank 130, and sodium silicate, for example from feed tank 140, in a mixing vessel, such as gel make-up tank 160. The synthesis gel is preferably prepared at ambient temperatures using cool reagents. Gel make-up tank 160 is a vessel reserved exclusively for this process step. Gel make-up tank 160 can be of a size suitable to prepare more than a single crystallizer batch of material. Optionally, however, the aluminosilicate synthesis gels may be made up by addition of all the reagents directly to crystallizer 170. The fully dissolved silicate and aluminate reagent solutions can be combined with either order of sequential addition at either hot or ambient temperatures or by means of jet mixing. This allows some significant degree of flexibility in controlling crystal/particle size, morphology and bulk density.

Undissolved ATH 100 is also added to the gel make-up tank 160. The ATH powder can be added by itself into make-up tank 160 after the aluminate and silicate have been mixed together and the aluminosilicate synthesis gel has been formed, or by addition of the ATH powder to the sodium aluminate solution or to sodium silicate solution prior to mixing the aluminate and silicate together.

Initiator gel 150 is also added to make-up tank 160, preferably after the synthesis gel has already started to form from the combination of the sodium aluminate and sodium silicate solutions. Once all of the reagents have been mixed together in gel make-up tank 160 and the viscosity of the mixture is sufficiently reduced as required by the equipment, the mixture is transferred by pumping to one or more crystallizers 170. A single crystallizer may be used instead of a gel make-up tank, in which case, the reagents are mixed and the gels crystallized in the same vessel. After crystallization, the zeolite mixture is further processed through filtration and drying steps as shown generally in FIG. 1, and as described above specifically with reference to the process of this invention.

Figure 3:
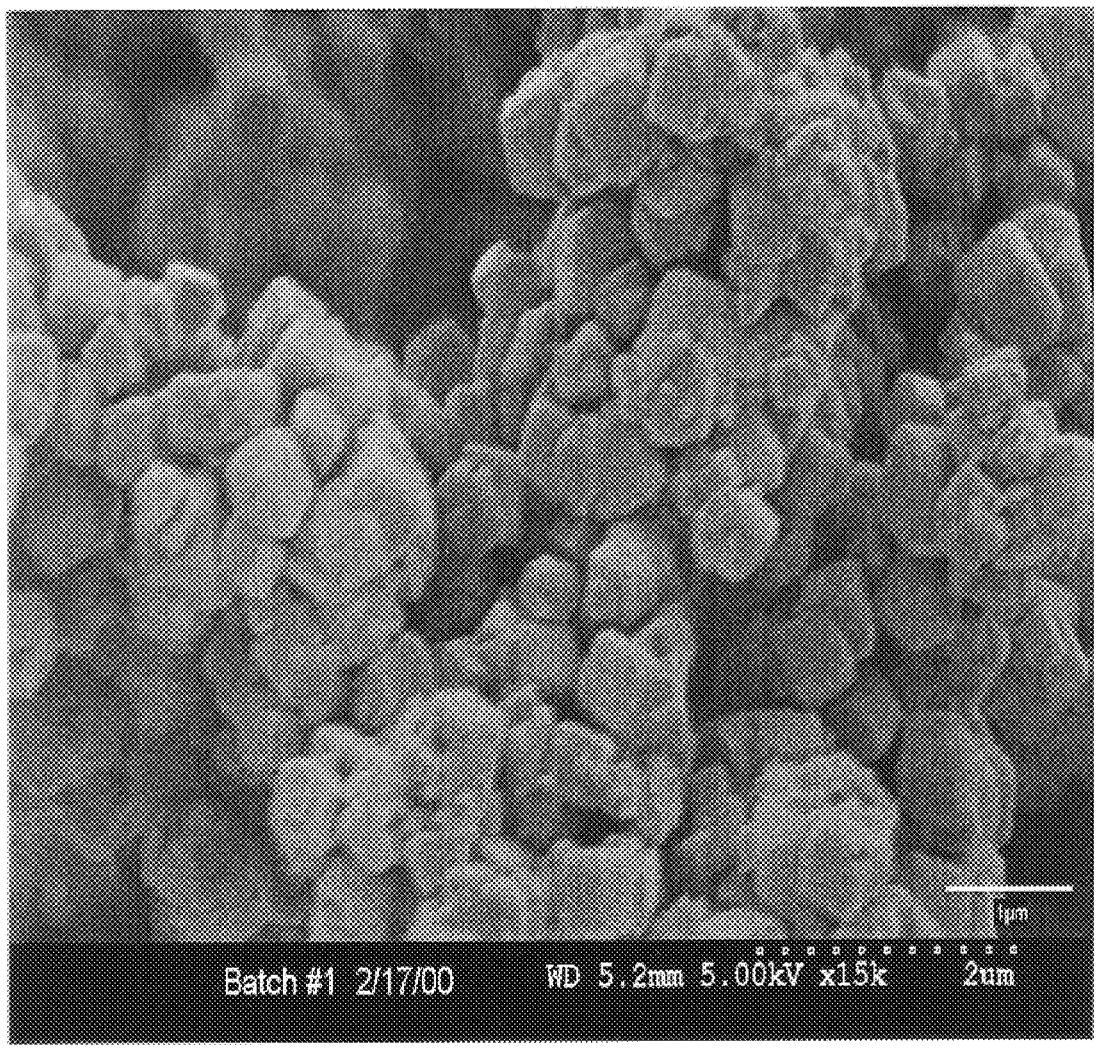
FIG. 3 is an SEM micrograph of a zeolite product according to the present invention.
Figure 4:
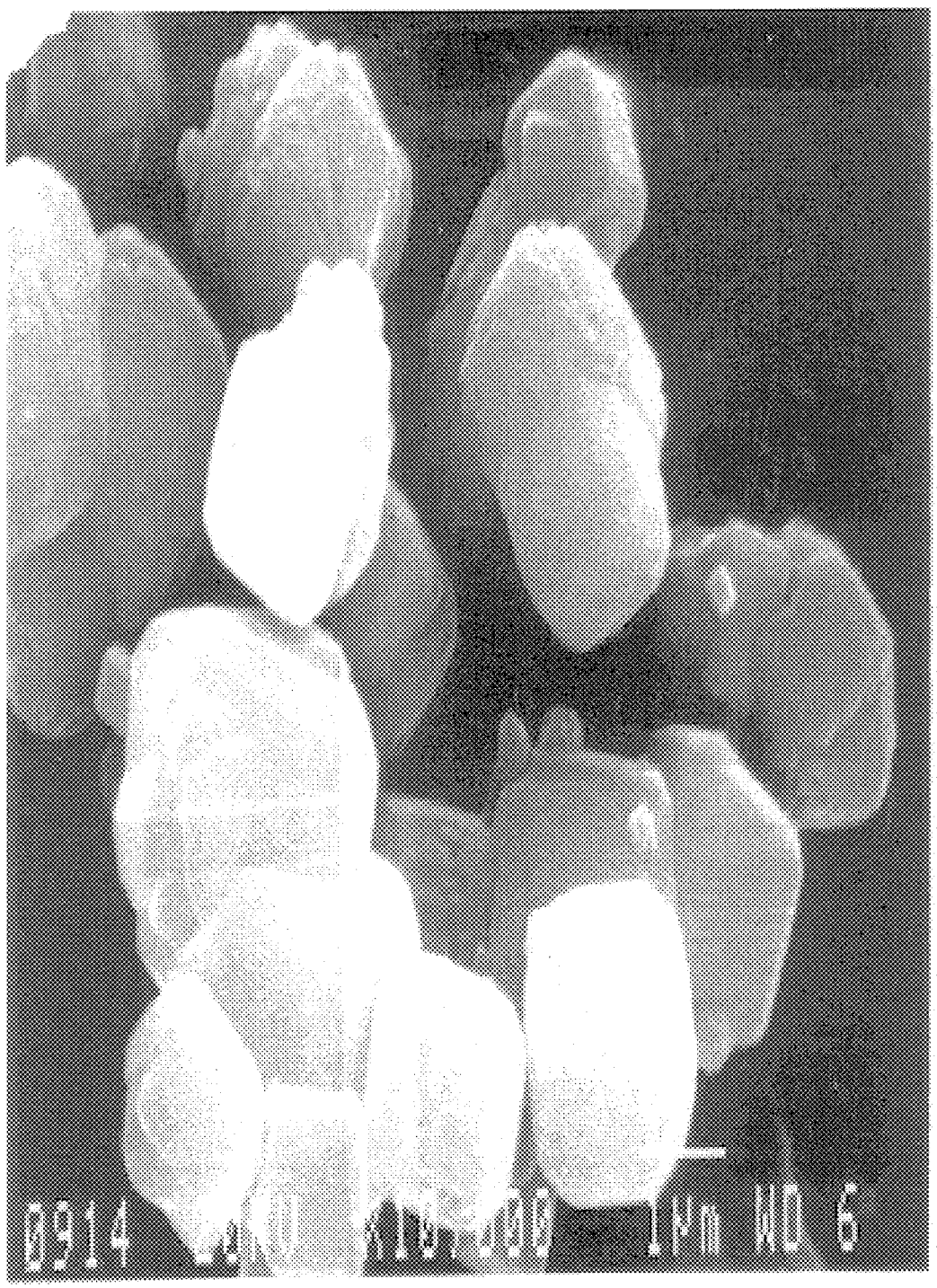
FIG. 4 is an SEM micrograph of a zeolite product, VALFOR® 100.

The zeolite A manufactured by the above process typically has a crystal size in the range of about 0.2 to about 0.7 microns, preferably less than about 0.5 microns. Larger particles consist of inter-grown aggregates or loose agglomerates. This small crystal size and open agglomerate structure is readily apparent upon review of the SEM micrograph of FIG. 3, showing a zeolite of the present invention, as compared to the SEM micrograph of FIG. 4, showing a zeolite manufactured by the standard process described in the background section herein. This open particle structure is reflected in a lower bulk density of about 0.19 to about 0.35 grams/milliliter and the median particle size of about 2 to about 4 microns. It is believed that the increased surface area provided by the smaller crystal size and open structure only partially explains the dramatic performance results exhibited by the zeolite.

Zeolite surface area is generally determined by the B-E-T method, which is described in Brunauer et al., J. Am. Chem. Soc., Vol. 60, p. 309 (1938), and which measures surface area by nitrogen adsorption at the boiling temperature of liquid nitrogen (−195.6° C.). Because the interstitial pore size of zeolite A is smaller than the kinetic diameter of the nitrogen molecule adsorbate, this nitrogen adsorption method can only measure the external surface area of zeolite A particles. The external surface area of zeolite crystals is usually on the order of a few square meters per gram and is negligible in comparison to the hundreds of square meters of surface area provided by the zeolite pores for example in zeolite X. Measurement of relatively small areas is subject to a higher percentage error, but nonetheless the measurement does allow a distinction to be made between the external surface areas measured for the zeolite A products of this invention and the external surface areas measured for a current commercial product. Because the micropores in zeolite X are larger and accessible to $N_2$ molecules, this measurement cannot be used to characterize the external surface of A/X mixtures. As shown in Table 1, below, it is possible to calculate an equivalent spherical diameter for uniformly sized, smooth surfaced, particles having the density of zeolite A that will have the same geometric surface area (in $m^2/g$) as that measured for the zeolite A product produced by the process of this invention. When this calculation is made the equivalent spherical diameter is found to be very much smaller than the actual particle size as measured by a Malvern Mastersizer-E model particle size analyzer, manufactured by Malvern Instruments, Ltd., Spring Farm South, Malvern, Worcestershire, UK. The equivalent spherical diameter tabulated in Table 1 is given by:

$$D = \frac{6}{\rho A}$$

where D=the equivalent spherical diameter in microns; ρ=is the crystal density (1.99 $g/cm^3$); and A=the surface area in $m^2/g$.

TABLE 1

| | Surface Area $m^2/g$ | CER 10° C. | CEC 10° C. | LCC g/100 g | Median Particle Size Microns | D(V,0.9) 10% greater than size Microns | Reciprocal Root of Surf. Area 1/micron | Equivalent Spherical Diameter Microns |
|---|---|---|---|---|---|---|---|---|
| Valfor 100 | 1 | 167 | 250 | 50 | 3.64 | 7.4 | 1 | 3.0 |
| Valfor 100 | 3 | 187 | 266 | 60 | — | — | 0.58 | 1.0 |
| Valfor 100 | 2 | 187 | 291 | — | — | — | 0.71 | 1.5 |
| Example 1 | 12.0 | 244 | 266 | 93 | — | 7.8 | 0.29 | 0.25 |

TABLE 1-continued

|  | Surface Area m²/g | CER 10° C. | CEC 10° C. | LCC g/100 g | Median Particle Size Microns | D(V,0.9) 10% greater than size Microns | Reciprocal Root of Surf. Area 1/micron | Equivalent Spherical Diameter Microns |
|---|---|---|---|---|---|---|---|---|
| Example 2 | — | 229 | 276 | — | 4.4 | 9.0 | — | — |
| Example 3 | 5.8 | 235 | 308 | 75 | 2.8 | 6.6 | 0.42 | 0.52 |
| Example 3 | — | 220 | 283 | 78 | 2.8 | 6.5 | — | — |
| Example 3 | — | 233 | 303 | 75 | 2.7 | 5.9 | — | — |
| Example 3 | — | 235 | 312 | 78 | 2.5 | 5.6 | — | — |
| Example 3 | 6 | 182 | 284 | 77 | 2.4 | — | 0.41 | 0.50 |
| Example 3 | 7 | 225 | 287 | 78 | 2.5 | 5.9 | 0.38 | 0.43 |
| Example 4 | 17.0 | 252 | 278 | 103 | 2.8 | 6.1 | 0.24 | 0.18 |
| Example 7 | 7.0 | 224 | 310 | — | 3.7 | — | 0.38 | 0.43 |
| Example 8 | — | 203 | 286 | 55 | 3.3 | 7.7 | — | — |
| Example 8 | 10.0 | 231 | 287 | 55 | 4.2 | 20.1 | 0.32 | 0.30 |
| Example 8 | — | 225 | 265 | 47 | 3.4 | 9.6 | — | — |
| Example 9 | 27.0 | 272 | 287 | — | 3.4 | 8.4 | 0.19 | 0.11 |

For materials of conventional synthesis such as are produced by the methods known in the art (e.g. VALFOR® 100), the calculated particle size (ESD) of 3.0 microns is reasonably close to the measured median particle size of 4–5 microns, while the actual crystal size observed by SEM is on the order of 1–2 microns. The materials of this invention have average particle sizes measured in the 2–4 micron range with crystal sizes lying fairly uniformly in the size range 0.4–0.5 micron. Actual particles of synthetic zeolites usually consist of inter-grown aggregates with a broad distribution of sizes. The actual external surface of individual crystals in such aggregates must be reduced by the area of contact where crystals inter-grow so that even the most generous assumptions do not allow the calculation of an external surface area that is commensurate with the observed crystal and particle dimensions of the zeolite A of this invention.

Without being limited to any single theory, it is believed that the exceptionally high surface areas actually measured in the materials of this invention have their origin in a source other than the conventional area that would be calculated from the crystal or particle dimensions. Roughness at the surface of an otherwise regular geometric form will obviously increase surface area above that calculated for a smooth object of the same shape and dimension. Analysis by the methods of fractal geometry show that surface area for a given object can, in mathematical theory, be increased without limit by postulating a self-similar roughness at progressively smaller scales of observation. Such non-Euclidean surfaces are said to be fractal. A detailed exposition of the principles of fractal geometry is contained in the book by B. Mandelbrot, *The Fractal Geometry of Nature*, W. H. Freeman and Co., San Francisco (1982). It is believed that the unusually large surface areas measured on the products of this invention are the consequence of a high degree of surface roughness some of which may be on a scale invisible under the magnification obtainable by SEM. It is further believed that this surface roughness is especially enhanced by a high rate of crystal growth such that step growth, defects, and surface nucleation occur.

A type of growth pattern that could contribute to surface roughness on the atomic scale has been detected on the crystal surfaces of zeolite A by atomic force microscopy. See S. Sugiyama et al., *Microporous and Mesoporous Materials*, Vol. 28, (1999) pp. 1–7. These workers reported side-by-side pyramidal growth features on the flat surfaces of large NaA crystals together with "basin" structures in the surface up to 50 nanometers deep. In this particular study different sized, stepped-growth, pyramids up to 90 nanometers in height were observed. We cannot confirm that this specific morphology is found on the products of this invention, but we suggest that the high surface area measured on these products is consistent with effective contributions from such a demonstrated growth pattern. Such disorderly growth processes are known to produce surface roughness and irregularity in ordinary crystal growth. Cf. R. W. Mullin, *Crystallisation*, CRC Publishers (1972). Indeed, it is known in the art of conventional crystallization technology that the growth of "perfect," smoothly faceted, crystals requires care to ensure low levels of supersaturation that result in slow growth rates. It appears from the data that the process of this invention promotes high solution super-saturation in the presence of plentiful numbers of nuclei, such that these nuclei undergo very rapid and disorderly growth, leading to the creation of high surface area material due both to somewhat smaller crystal and particle size, and especially to an enhanced degree of surface roughness. Thus, the combination of smaller particle and crystal size together with the fractal structure of crystal surfaces appear to explain the surprising properties of the zeolite product produced by the process of this invention.

Figure 5:
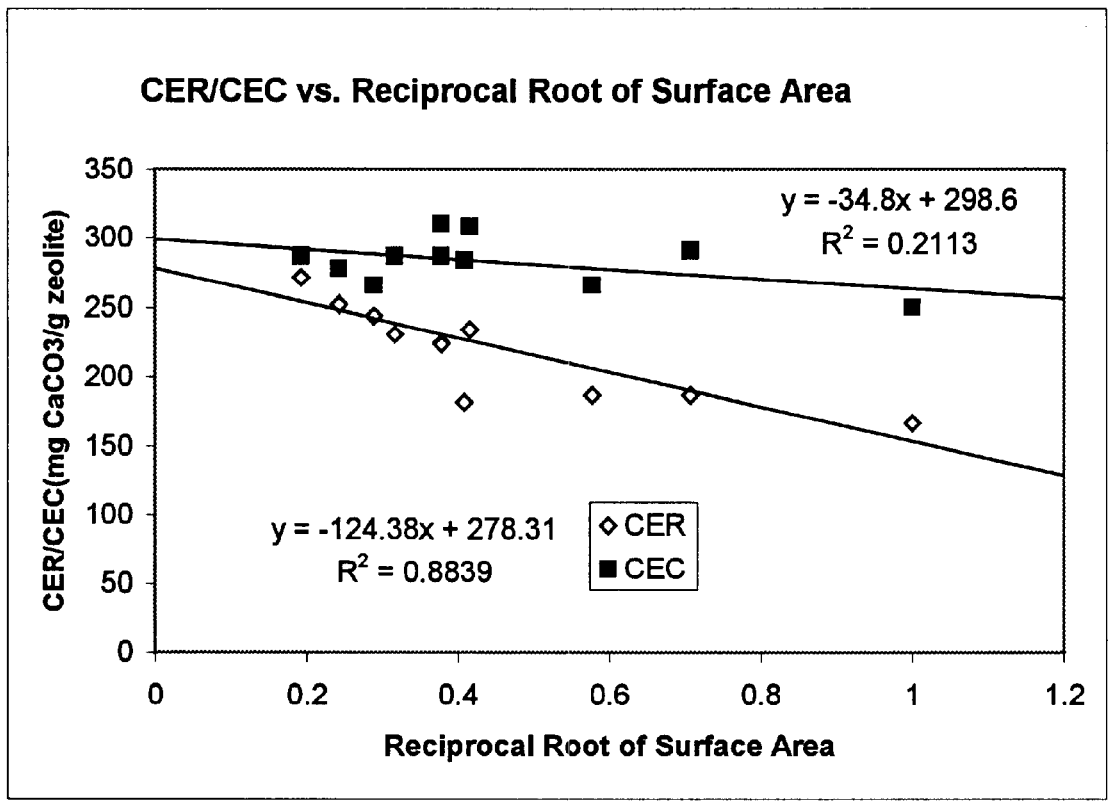
FIG. 5 is a graph showing CEC and CER data plotted against the reciprocal root of the surface area for a variety of zeolite A samples.

Data from Table 1 are shown plotted in FIG. 5. CER and CEC data in FIG. 5 are plotted against the reciprocal of the square root of the surface area as measured by nitrogen absorption. Because area is a function of a dimension $D^2$, the ordinate axis in the plot is effectively the reciprocal of a particle diameter (1/D). Since volume is a function of $D^3$, 1/D is equivalent to a surface area per unit volume ($D^2/D^3$) for uniform particles of diameter D.

Figure 6:
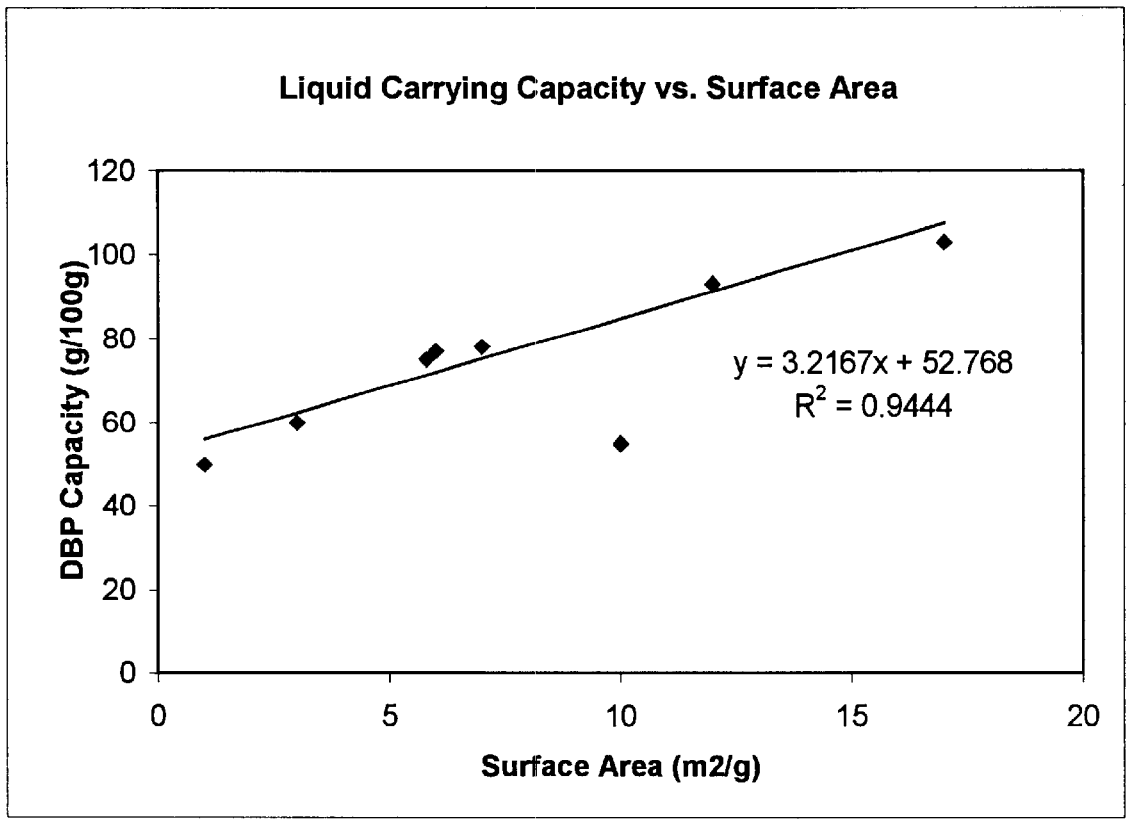
FIG. 6 is a graph showing LCC data plotted against the measured external surface area for various samples of zeolite A prepared by the process of this invention.

Zeolites made by the above process have a liquid carrying capacity (LCC) greater than 70 grams liquid per 100 grams of zeolite (hydration water included). As appears in FIG. 6, materials of this invention exhibit a linear increase in LCC values with increasing surface area. Since the hydrated zeolite micropore capacity is already saturated, the LCC values reflect the increased interstitial void volume associated with greater external surface area. The LCC values are measured using a torque rheometer (C. W. Brabender Absorptomerter Type E equipped with a mechanical syringe, Model T90/50) using dibutylphthalate as the test liquid.

Zeolites made by the above process have a calcium exchange rate (CER) in cold (10° C.) water at 2 minutes of greater than 200, preferably greater than 220, milligrams of $CaCO_3$ per gram of anhydrous zeolite. The calcium exchange capacity in cold (10° C.) water at 15 minutes is greater than 250, preferably greater than 260, milligrams of $CaCO_3$ per gram of anhydrous zeolite.

The reported CER values in Table 1 are not, strictly speaking, exchange rates. The CER values reported herein, unless otherwise specified, are by convention representative of the amount of $Ca^{2+}$ removed at a fixed temperature from a standard test solution over a period of 2 minutes. This quantity is expressed in units of mg $CaCO_3$/g of anhydrous zeolite. Division of CER values by 2 minutes converts the parameter to units of rate averaged over the time interval. Similarly, the CEC value represents the total amount of $Ca^{2+}$ removed at a fixed temperature from the same test solution over a period of 15 minutes. CEC equals the true exchange capacity of the zeolite only for the case where equilibrium is reached in this time. For the numbers reported herein, CEC and CER are determined as follows. First, the percent loss on ignition (% LOI) of the zeolite at 800° C. for 0.5 hours is determined. 250 ml of a calcium exchange solution is transferred to a 400 ml beaker containing a magnetic stirring bar. The beaker is covered with a watch glass to minimize evaporation. The calcium exchange solution comprises a solution of $CaCl_2$ in distilled water equivalent to 1000 ppm $CaCO_3$. The pH of this solution is adjusted to 10 pH with ammonium hydroxide or HCl as needed. The exchange solution is placed in a constant temperature bath to allow the solution to equilibrate to the desired temperature (10° C.+−0.3° C.). The stirrer is adjusted to approximately 600 rpm to generate a small vortex. (500 mg±0.1 mg)/(1-% LOI/100) of the zeolite is rapidly transferred to the exchange solution. After 2 minutes, about 30 ml of the suspension is withdrawn in a 15-second period through a disposable filter on the end of a 30 ml syringe. A 10.0 ml aliquot of the filtrate is then transferred into a 125 ml Erlenmeyer flask. 5 ml of 1M NaOH and about 100 mg of Hydroxy Napthol Blue Indicator is added to the flask. The sample is titrated with 0.005M EDTA to a definite blue endpoint. For each quantity of calcium exchange solution prepared, a 10.0 ml aliquot of the "blank" calcium exchange solution is also titrated as above twice and averaged, with less than 0.1 ml deviation between the two blanks being acceptable. The CER, expressed in milligrams of $CaCO_3$ per gram of anhydrous zeolite is calculated as follows:

$$\frac{(B-V) \times M \times 100.09 \times 25}{W \times S}$$

where:
B=Volume (ml) of EDTA solution required to titrate the blank
V=Volume (ml) of EDTA solution required to titrate the sample
M=Molarity of EDTA
W=Sample weight in grams
S=Solids content of sample expressed as a decimal (1-LOI)
100.9 is the molecular weight of $CaCO_3$
25 is a constant (250 ml $Ca^{++}$ solution/10 ml aliquot)

To arrive at the cation exchange capacity (CEC), the same procedure above is performed for a sample taken with the syringe from the continuously mixing zeolite/exchange solution at 15 minutes.

For the measurements provided herein, percent crystallinity and phase purity were measured using a Phillips X-Ray Diffractometer, Model X'pert MPD VW3040, manufactured by Phillips Electronics B. V. of Amelo, NL. Nitrogen surface area measurement were made using a Quantachrome Autosorb-6-II, manufactured by Quantachrome Corp. of Boynton Beach, Fla. Preferred procedures for multipoint B-E-T surface area analysis are described in detail in S. Lowell and J. E. Shields, "Powder Surface Area and Porosity", $3^{rd}$ edition (1991), Chapman and Hall London. Particle size measurement were made using a Malvern Mastersizer-E model particle size analyzer, as described above.

Figure 7:
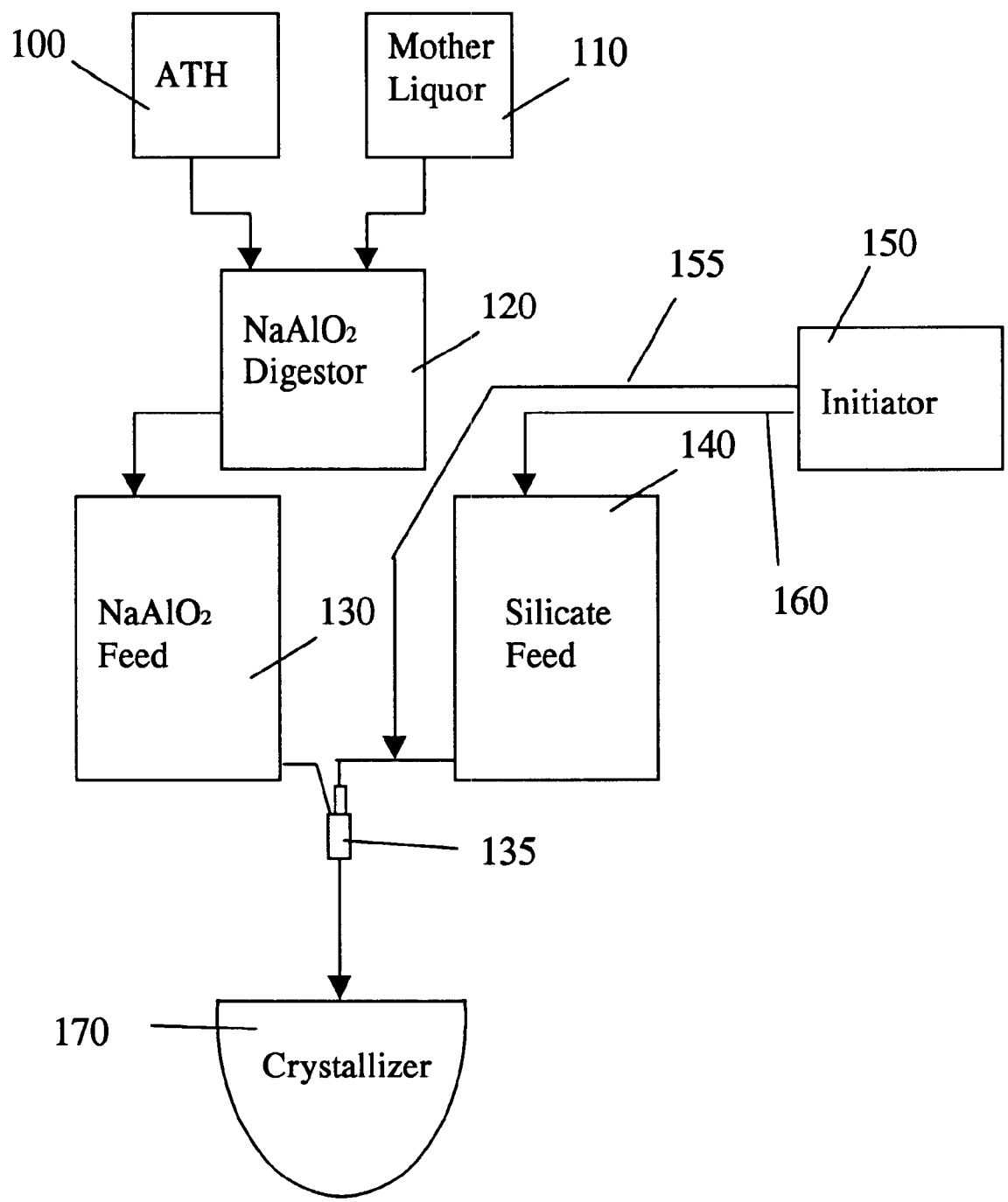
FIG. 7 is a schematic diagram of another exemplary process of the invention.

Alternative embodiments of the process, conducted in Examples 7 and 8, are depicted generally in the schematic process flow diagram of FIG. 7. The sodium aluminate is preferably made-up in digester 120 by heating recycled mother liquor solution 110 and adding as much ATH powder 100 as is required to meet the $Al_2O_3$ formulation composition specified for the synthesis batch in the examples cited above. In a first alternative embodiment, the initiator mixture 150 is pumped by means of a mechanical pump through line 155 for addition to silicate reagent feed stream 157 just prior to the combination of the silicate and aluminate feed streams in a jet mixer. The initiator can be added to the silicate at a uniform rate throughout the entire period of silicate addition or by intermittent injection of small volumetric portions during the period of gel make-up by using commercially available metering pumps. The combination of initiator and silicate liquid streams may also be effected in a variety of other ways known in the art, including in-line static mixing devices or intermediate mix tanks with continuous flow discharge. As another alternative to the delivery of the initiator to the jet-mixer via line 155, the appropriate quantity of initiator gel may be combined with the silicate reagent solution in the silicate feed tank 140 via line 160. Sodium aluminate from feed tank 130 is pumped through jet mixer 135 to entrain and mix with the sodium silicate/initiator mixture from feed tank 140. The silicate reagent can be discharged by gravity flow or by an appropriate mechanical pump. The combined reagents are discharged from the jet mixer into the crystallizer 170. The initiator gel may have a molar composition $aNa_2O.bAl_2O_3.cSiO_2.dH_2O_3$ where the ratio of a/c is in the range of 1–9, preferably in the range of 1–3, the ratio of c/b is in the range of 8–75, preferably in the range of 10–30, and the ratio of d/b is in the range of 100–600, preferably in the range of 200–400. A preferred composition is $16Na_2O.Al_2O_3.15SiO_2.300H_2O$.

Further details of the invention are provided in detailed preparatory examples set forth below.

EXAMPLES

Example 1

A 30 gallon preparation of the zeolite of this invention was made using a formula composition expressed as the mole ratio of oxides: $3.4Na_2O.Al_2O_3.1.95\ SiO_2.100\ H_2O$. The reagent sources for these oxides were separately prepared and combined as described below.

The sodium aluminate solution was prepared in an aluminate digester vessel. To prepare this solution a 30 gallon steel reactor was charged with 18.6 kg of 50% NaOH (38.75% $Na_2O$) solution. 6.74 kg of alumina trihydrate (ATH, 65% $Al_2O_3$) was added (80% of the batch alumina) to the NaOH solution. The tank was then heated to 205–212° F. (96–100° C.). This temperature was maintained with mixing for about 1 hour, after which time all of the ATH was dissolved. 65.6 kg of de-ionized water was then added and the solution was cooled to 100° F. (38° C.).

23.96 kilograms of a sodium silicate solution (JL-Silicate provided by PQ Corporation) with a oxide composition of $1.6SiO_2.Na_2O$ (mole ratio) and containing by weight:

25.75% $SiO_2$; 16.75% $Na_2O$; 57.5% $H_2O$ was added to a crystallizer vessel of about 30 gallon total capacity. The silicate solution had a density of 12.7 lbs/gal. This vessel was equipped with baffles and two propeller type agitators driven by a 1-horsepower motor. The silicate solution, supplied from storage, had a temperature of about 80° F. (27° C.).

A batch of initiator gel was prepared approximately 16 hours before the make-up of the synthesis gel to allow time for "aging". The following mole oxide composition was used: $16Na_2O.Al_2O_3.15SiO_2.300H_2O$. 355 g of sodium silicate (N®-clear sodium silicate solution, manufactured by PQ Corporation and having a composition of 28.5% $SiO_2$ and 8.5% $Na_2O$) was added to a container together with 241 grams of $H_2O$ and 180.6 grams of 50% caustic. 48.9 grams of a separately prepared sodium aluminate solution (23.3% $Al_2O_3$; 19.8% $Na_2O$) at ambient temperature was slowly added to the dilute silicate with intensive mixing to minimize gel formation. Reagents were mixed in the container at ambient temperature by means of a portable mixer equipped with a pitch blade turbine agitator. The separately-prepared sodium aluminate solution was made by dissolving ATH powder in a 50 weight percent aqueous solution of NaOH which was heated near boiling until all the alumina powder dissolved. The aluminate solution was diluted with water and then cooled to room temperature prior to use for the initiator gel make-up. After mixing the initiator gel was set aside to age for 16 hours.

For the process of making the synthesis gel, the sodium aluminate solution prepared as above was added to the silicate solution in the crystallizer vessel at a controlled rate, without heating, over a period of about 30 minutes. When the addition of the aluminate solution was complete, 1.72 kg of alumina trihydrate powder (65% $Al_2O_3$) was added to the gel slurry. Finally, 825.9 grams of the aged initiator gel was added to the crystallizer slurry. The gel mixture was then heated to 200–205° F. using a steam sparge. After reaching the desired temperature in approximately 30 minutes the batch, was held at that temperature in the insulated tank for about 1 hour. Subsequent x-ray diffraction analysis of a sample from the crystallizer showed that the product was >95% crystalline relative to a reference sample of sodium A zeolite. By chemical analysis the anhydrous composition of the product was found to be: 33.5% $SiO_2$; 28.1% $Al_2O_3$; 17.9% $Na_2O$ indicating a mole $SiO_2/Al_2O_3$ ratio for the product of 2.0. The CER, CEC, surface area, and particle size data for this example are shown in Table 1.

Example 2

A 50 gallon batch was prepared using the same reagents and formulation as in Example 1 but using a hot aluminate mixture with 80 percent of the batch alumina dissolved and 20 percent of the batch alumina as undissolved ATH powder. The aluminate solution was prepared in a 30 gal vessel by adding 21.9 kg of 50% NaOH solution (38.75% $Na_2O$) followed by the addition of 7.86 kg of alumina trihydrate powder. The slurry was heated to 105° C. and stirred until all the alumina dissolved at which point the solution was diluted with 79.4 kg of water. The solution was re-heated to 95° C. and 1.99 kg of alumina trihydrate powder was added to the aluminate solution. This aluminate slurry mixture was added to 27.8 kilograms of the Na-silicate solution at ambient temperature in the crystallizer vessel over a period of 22 minutes. The gel temperature at the end of this addition was 168° F.(76° C.). 0.96 kg of the initiator gel, with the same composition as in Example 1, was added and the final gel heated quickly to temperature by means of a steam jacket on the vessel. Digestion was continued for one hour at temperature. Product was filtered and washed using a filter press and dried in a flash dryer. A sample of the material was determined to be pure and fully crystalline zeolite A with a median particle size of 4.4 microns. The 10° C. CER and CEC values for a sample of this product were 229 and 276 respectively.

Example 3

A commercial scale preparation of the zeolite of this invention was made using a formula composition expressed as the mole ratio of oxides: 3.4 $Na_2O$ $Al_2O_3$.1.9 $SiO_2$.100 $H_2O$. The reagent sources for these oxides were separately prepared and combined.

The sodium aluminate solution was prepared in a digester vessel with the composition expressed in weight percent as: 4.8% $Al_2O_3$; 7.9%$Na_2O$; 87.3% $H_2O$. To prepare this solution several thousand pounds (several thousand gallons) of mother liquor solution was added to a closed steel vessel equipped with a heated oil jacket and agitator and heated to approximately 205–212° F. The composition of the mother liquor, given in weight percent, is typically: 0.54% $Al_2O_3$; 8.46% $Na_2O$; 91% $H_2O$. A quantity of $Al_2O_3.3H_2O$ (ATH) was added to this solution while temperature and agitation was maintained. The slurry was heated at temperature for approximately 1 hour until the ATH solids dissolved. The quantity ATH required was determined by analysis of the mother liquor and was sufficient to bring the overall composition of the mixture to the target alumina percentage. In this typical instance 7.0 lbs ATH/cwt of mother liquor solution were added to the digester. This aluminate solution was allowed to cool to about 100° F. before combination with the silicate reagent. This aluminate solution was deficient by 20% in the total amount of $Al_2O_3$ required by the synthesis formulation. The alumina deficiency was made up later by the addition of ATH powder to the gel mixture.

Next, a sodium silicate solution having a weight of about 25.2% of the weight of the final aluminate reagent solution and having a oxide composition of 1.6 $SiO_2.Na_2O$ (mole ratio) and containing by weight: 25.4% $SiO_2$; 16.8% $Na_2O$; 57.8% $H_2O$, was added to a crystallizer vessel of several thousand gallon total capacity. The vessel was equipped with baffles and two pitched-blade turbine agitators driven by a motor sized at 200 gallons of tank capacity/horsepower. The silicate solution, supplied from a bulk feed tank, was metered into the crystallizer vessel by means of a commercial flow meter. It had a temperature of about 80° F. when metered into the crystallizer.

A batch of initiator gel was prepared approximately 16 hours before the make-up of the synthesis gel to allow time for "aging". The batch of initiator was prepared in a 55-gallon steel drum. Reagents were mixed in the drum at ambient temperature by means of a portable mixer equipped with a marine propeller. The mole oxide gel composition used was: $16Na_2O.Al_2O_3.15 SiO_2.300 H_2O$. For each pound of sodium silicate (N®-clear sodium silicate solution, described in Example 1) added to the drum, together with 0.668 lbs of $H_2O$, and 0.503 lbs of 50% caustic (38.8% Na2O) were added. 0.16 lbs per lb of sodium silicate of a separately-prepared sodium aluminate solution at ambient temperature was slowly added to the dilute silicate with intensive mixing to minimize gel formation. The separately-prepared aluminate solution was prepared as described in Example 1.

In the make-up of the synthesis gel the aluminate solution was added to the silicate solution in the crystallizer vessel at a controlled rate, without heating, over a period of about 45–60 minutes. When the addition of the aluminate solution was complete, another 1.75 lbs ATH (65% $Al_2O_3$)/cwt of mother liquor solution was added to the gel slurry. Finally, a quantity of the aged initiator gel was added to the crystallizer slurry in an amount equal to 0.90 lbs/cwt mother liquor solution. The synthesis mixture was then heated to 200–205° F. by re-circulation of the slurry through a heat exchanger. After reaching temperature in approximately 30 minutes, the batch was held at temperature in the insulated tank for about 1 hour until x-ray diffraction analysis of a sample from the crystallizer showed that the product was >95% crystalline relative to a reference sample of sodium A zeolite.

The CER, CEC, surface area, and particle size data for product produced by this example are shown in Table 1.

Example 4

23.96 kg of a silicate solution (1.5 SiO2/Na2O ratio sodium silicate, 25.4% SiO2) was added to a 30 gallon crystallizer along with 65.1 kg of de-ionized water. A sodium aluminate solution was prepared starting with a pre-made, stable sodium aluminate solution (23.3% Al2O3.19.8% Na2O 56.9% H2O) and adding 6.55 kg of 50% NaOH to 23.5 kg of this aluminate solution. This solution was cooled to below 100° F. This aluminate was then added to the silicate solution over a one hour time period. The initiator was added and the slurry was heated to 203° F. using a steam sparge (20 psig steam) with vigorous mixing. This temperature was held for about 1.5 hours. The slurry was filtered and washed with 100 gallons of 150° F. de-ionized water and then dried in a lab-scale flash dryer. The resulting product was pure zeolite A (>95%). The CER, CEC, SA, and particle size for this example are reported in Table 1.

Example 5

This example illustrates the formation of A/X mixtures when 40 percent of the batch alumina is added as ATH powder.

790 grams of the sodium silicate solution described in Example 3 was added to a 4-liter mixing vessel. A sodium aluminate solution was prepared by mixing together 2,228 grams of H2O, 375.5 grams of 50% NaOH, and 465.1 grams of pre-prepared stable sodium aluminate solution (23.3% Al2O3; 19.8% Na2O; 56.9% H2O) and then cooling the aluminate solution to below 100° F. The aluminate solution was gradually added to the silicate solution over a time period of 1 hour by means of a Masterflex pump. 113.3 grams of ATH powder were added to this gel and, immediately following the ATH powder, 27.2 g of initiator gel were added to the mixture. 2000 grams of the resulting slurry was added to a 2 liter baffled reactor equipped with a reflux condenser, and heated to 203° F. in a water bath while stirring at 300 rpm with a turbine agitator having a 2-inch pitch blade. The temperature was held for about 1.5 hours. The crystallized zeolite was filtered and washed well with de-ionized water and dried on a lab-scale flash dryer. The resulting product was 90% zeolite A and 10% zeolite X.

Example 6

Example 5 was repeated using the same equipment and reagents but with 60 percent of the alumina supplied in the form of undissolved ATH. 800 g of JL silicate were added to the make-up vessel. 313 grams of standard Na-aluminate were combined with 460 grams of 50 percent NaOH and 2229 grams of water. This solution, after cooling to room temperature, was pumped into the silicate in the make-up vessel over a period of 20 minutes. The mixture remained fluid. Immediately after the addition of aluminate solution was complete 171 grams of ATH powder were added to the vessel followed by the addition of 27.5 grams of the standard initiator gel. The gel was mixed for 15 minutes, transferred to the autoclave at atmospheric pressure and heated to 95° C. over a period of about 30 minutes. Digestion was continued for about 3 hours at which point the batch was quenched with cold water and recovered. The product was found to be fully crystalline by X-ray diffraction analysis and consisted of a mixture of zeolites A and X with no trace of undissolved ATH. Measurement of the unit cell size of the zeolite X phase in the mixture gave a value of 25.0 Å, corresponding to a framework Si/Al mole ratio of about 1.0., but the bulk chemical analysis of the mixture had a $SiO_2/Al_2O_3$ mole ratio of 2.1.

Example 7

A plant-scale experimental run was performed in accordance with an embodiment of the present invention. A sodium aluminate solution was prepared having the composition shown in Table 2. Of the 5.52 wt % total $Al_2O_3$ in this reagent, approximately 15–25% may have been present as undissolved ATH powder because the total $Al_2O_3$ was somewhat in excess of the equilibrium solubility of ATH in this mixture.[1]

[1] The amount of undissolved alumina in the aluminate reagent varies depending upon the digestion temperature and time, the $Na_2O$ concentration, and specific characteristics of the ATH powder including particle morphology and degree of fineness. A well-defined mixture of soluble sodium aluminate and undissolved ATH can be obtained by dissolving 80 wt. percent or less of the total required ATH and adding the remaining ATH powder to the aluminate solution at the end of digestion.

A silicate solution and the initiator gel were prepared as described elsewhere herein, and the initiator solution was added to the silicate with an injection pump more or less simultaneously as the silicate and aluminate were mixed together in a jet mixer. The jet mixer is an annular pipe within which two or more liquids are combined and discharged into the crystallizer. The actual process of this example comprised pulsed initiator addition into the silicate prior to jet mixing for 5 seconds of every 30 seconds over the approximately 15 to 17 minute silicate addition time. Although initiator levels may vary widely from small amounts to relatively large amounts, a moderate to low level of initiator solution was used for this example, resulting in about 0.2 wt % of the alumina for the batch being supplied by the initiator solution. Tables 2 and 3, below, provide the weights of the reagents used in pounds per hundredweight (lbs per cwt) of sodium aluminate and the mole ratios of the ingredients used, respectively:

TABLE 2

|  | lb/cwt Na-Al | wt % $Na_2O$ | wt % $Al_2O_3$ | wt % $SiO_2$ |
|---|---|---|---|---|
| Sodium Aluminate (Na-Al) | 100 | 7.67 | 5.52 | 0 |
| Sodium Silicate Solution | 24.1 | 16.8 | 0 | 25.2 |
| Initiator Gel | 0.8 | 12.9 | 1.37 | 12.9 |

TABLE 3

|  | Na$_2$O/Al$_2$O$_3$ | SiO$_2$/Al$_2$O$_3$ | H$_2$O/Al$_2$O$_3$ |
|---|---|---|---|
| Mole Ratio: | 3.5 | 1.9 | 104 |

A silicate solution temperature above ambient temperature, in a range from about 100° F. to about 200° F., typically within about 120° F. to about 150° F., and averaging about 135° F. was used. An aluminate temperature above ambient temperature, in a range of about 170° F. to about 210° F., typically within about 190° F. to about 205° F., and averaging about 209° F. was used. The higher temperatures for reagent mixing reduce the time required for gel heat up since the reagent mixture is near the crystallization temperature of about 190° F. to about 205° F. The crystallization temperature for this example was about 195° F. after jet mixing was completed.

The gel mixture was crystallized following the conventional practice using strong agitation and periodic sampling to obtain samples for x-ray diffraction analysis to determine the degree of crystallization. For this example, the duration of the entire crystallization unit operation was about 60 minutes. The product was filtered, washed and dried using existing plant systems.

Evaluation of the samples indicated significantly improved CER/CEC performance with good manufacturing material handling properties, meaning that there was essentially no reduction in process cycle time as compared to existing commercial zeolite processes. The manufacturing process time for the process as discussed in this example is about 40% to 60% less than for a plant-scale procedure where the aluminate solution is first cooled and then added into silicate slowly, followed by ATH powder addition and initiator gel addition.

Example 8

Another plant-scale experimental run was performed in accordance with an embodiment of the present invention, similar to Example 7, except as noted herein. The actual proportion of undissolved alumina in this example was not measured but was estimated to be in the range of 15% to 20%. The aluminate temperature was in a range of about 195° F. to about 200° F. and the silicate temperature was in a range of about 125° F. to about 130° F. Initiator solution was added to the silicate and the silicate and initiator solutions were more or less uniformly mixed together. The initiator and silicate mixture was then added to the aluminate at the jet mixer to form the synthesis gel.

This example used a relatively large level of initiator gel. The process comprised adding the initiator to the silicate and re-circulating the tank for about 15 minutes to mix the two reagents uniformly. The initiator/silicate mixture was added to the aluminate in the jet mixer within about 5 to 30 minutes of completing the recirculation mixing step. The amount of initiator used resulted in about 2.0 wt % of the alumina for the batch being supplied by the initiator. Temperatures and crystallization time were essentially the same as for Example 7. Tables 4 and 5, below, provide the weights of the reagents used in lbs per cwt of sodium aluminate and the mole ratios of the ingredients used, respectively:

TABLE 4

|  | lb/cwt Na-Al | wt % Na$_2$O | wt % Al$_2$O$_3$ | wt % SiO$_2$ |
|---|---|---|---|---|
| Sodium Aluminate (Na-Al) | 100 | 7.6 | 6.15 | 0 |
| Sodium Silicate Solution | 23.3 | 16.8 | 0 | 25.2 |
| Initiator Gel | 8.8 | 12.9 | 1.37 | 12.9 |

TABLE 5

|  | Na$_2$O/Al$_2$O$_3$ | SiO$_2$/Al$_2$O$_3$ | H$_2$O/Al$_2$O$_3$ |
|---|---|---|---|
| Mole Ratio: | 3.38 | 1.91 | 98 |

Evaluation of the samples from this example indicated good manufacturing material handling properties and significantly improved CER/CEC performance similar to Example 7. In Table 1 the CER data at 10° C. for Examples 7 and 8 can be compared against standard VALFOR® 100 zeolite product manufactured by a similar process but without any initiator gel present.

Over a 25% increase in exchange rate performance is demonstrated for zeolites produced by the processes of Examples 7 and 8 as compared to the VALFOR® 100 standard. Also, the zeolite product produced by the processes of examples 7 and 8 had a surface area in m$^2$/g (as measured by the B-E-T nitrogen adsorption method) of 7–10 times the surface area of the VALFOR® 100 standard, despite having a median particle size essentially the same or slightly larger than the standard.

Thus, examples 7 and 8 demonstrate that a high surface area product of this invention may be manufactured on a commercial scale with beneficial CEC and CER characteristics, but with a relatively "normal" median particle size, allowing for manageable processing characteristics.

Example 9

In an effort to distinguish the role of the initiator gel in the generation of A/X mixtures a zeolite preparation was made with 60 percent of the total batch alumina undissolved but without the addition of initiator gel. This example is to be compared with Example 6 in which the use of 60 percent undissolved alumina together with the initiator gel resulted in almost half of the crystalline product being zeolite X. The nominal mole composition of the formulation was: 3.4Na$_2$O.Al$_2$O$_3$.1.92 SiO$_2$.100 H$_2$O. With 60 percent of the alumina undissolved the initial virtual gel SiO$_2$/Al$_2$O$_3$ becomes 1.92/(1−0.6)=4.8.

In the baffled, 4-liter mixing vessel described previously 710 grams of a Na-silicate solution (25.75% SiO$_2$; 16.72% Na$_2$O) were added followed by the addition of 150 grams of aluminum trihydrate (ATH). In a separate vessel 275 grams of a standard Na-aluminate solution (19.8% Na$_2$O; 23.3% Al$_2$O$_3$) was combined with 405 grams of 50 weight percent NaOH solution and 1960 grams of H$_2$O. This solution was allowed to cool to room temperature prior to use. The cooled aluminate solution was transferred to the mix vessel containing the silicate and undissolved ATH over a period of 30 minutes using a peristaltic pump (Masterflex). When addition of aluminate was complete, the gel mixture was transferred to a sealed autoclave equipped with agitator and reflux condenser open to the atmosphere. The vessel was placed in a temperature-controlled water bath at 95° C. The fluid mixture in the vessel reached 95° C. in about 30 minutes. In the expectation that the crystallization rate would be reduced digestion at this temperature was continued for 3 hours, but a sample was taken at one hour for x-ray diffraction analysis. At 3 hours the reaction mixture was quenched with cold de-ionized water, filtered and washed. The filter cake recovered from a laboratory buchner funnel was dried in an oven at 95° C. to remove excess moisture. An x-ray diffraction measurement of the material showed that the product was zeolite A with a possible trace of a crystalline phase tentatively identified as X. No undissolved ATH was detectable as judged by the absence of any indication of the strongest ATH peak at 18.1° 2-theta. Table 1 shows the characterization results for the material processed after 3 hours digestion. The sample taken at 1 hour was later analyzed and found to consist of fully crystalline, phase pure, zeolite A.

In preparation for measurement of the Ca-exchange capacity 40 grams of the dried, air equilibrated, filter cake were subjected to treatment for one minute at the highest setting in a laboratory blender. Such treatment had been found in separate experiments to simulate the effect of the pilot and commercial flash dryer on the powder performance in a $Ca^{2+}$ exchange test. After this treatment the 10° C. CER value at 2 minutes was measured as 272 while the corresponding CEC value was 287. Additional characterization results for this material are summarized in Table 1.

In order to explore the limits of this approach to zeolite A synthesis we repeated the experiment using the same reagents and stoichiometry but with 80 percent of the alumina undissolved. Crystallization was again complete in one hour at 95° C. with zeolite A as the product containing trace amounts of another phase tentatively identified as X.

Using the same reagents but with a more alkaline formulation: $4.5Na_2Al_2O_3.1.9\ SiO_2.100\ H_2O$, a batch was prepared in the same equipment with 87 percent of the alumina added as undissolved ATH. After digestion for one hour at 95° C. the dominant phase in the product was zeolite A with traces of sodalite and a slight amorphous hump in the XRD pattern in the 20–40 degrees 2-theta region.

The first experiment with 60 percent undissolved ATH was repeated using a water glass solution (N-clear, PQ Corp.) as the source of silica and with a reduced alkalinity gel composition: $2.4Na_2O.Al_2O_3.1.91\ SiO_2.100\ H_2O$. After digestion for one hour at 95° C., a trace of undissolved ATH could be detected in the XRD. A small amorphous hump remained together with a trace peak that may have been zeolite P (GIS). Repeating this experiment with the lower alkalinity formulation but using the monomeric JL-silicate solution (25.8% $SiO_2$; 16.8% $Na_2O$) gives, after one hour digestion, a fully crystalline A product with the only impurity detectable in the x-ray diffraction pattern being a trace amount of undissolved ATH. Slower crystallization and the formation of a zeolite impurity phase does not seem to be due to the lower gel alkalinity itself but possibly to the higher degree of polymerization of the soluble silica species in the water glass reagent.

These results demonstrate that zeolite A can be synthesized from common low-cost reagents by providing only a minor fraction of the batch alumina in soluble form. Not only does the practice of this invention provide a zeolite A product with superior performance properties, but the demonstrated process of this invention gives opportunity to reduce capital and unit operating costs by reducing the scale of the equipment required to prepare the soluble aluminate reagent and the time and manpower for its preparation. In these formulations, with so much of the alumina reagent present in what is commonly regarded as an inactive solid form, it is especially remarkable that full conversion of all reagents can be completed in about one hour. It seems possible that the initial, spontaneous, nucleation and crystallization of the "virtual" gel composition occurs rapidly due to the effective enhancement of alkalinity in the system that is brought about by the circumstance that so large a fraction of the batch alumina has not reacted with and consumed available NaOH. High alkalinity is known to favor both rapid nucleation and the dissolution of the amorphous gel for transport through solution to growing crystals. This interpretation is supported by SEM images showing zeolite particles containing sub-micron crystallites, highly twinned, forming inter-grown particles that, nonetheless, form a relatively narrow particle size distribution centered at a median size of 3.0 microns. (Table 1)

Duplicate chemical analysis of the material gave an average bulk $SiO_2/Al_2O_3$ mole ratio of 2.15 and an average $Na_2O/Al_2O_3$ ratio of 1.02.

Augmented Synthesis

Figure 9:
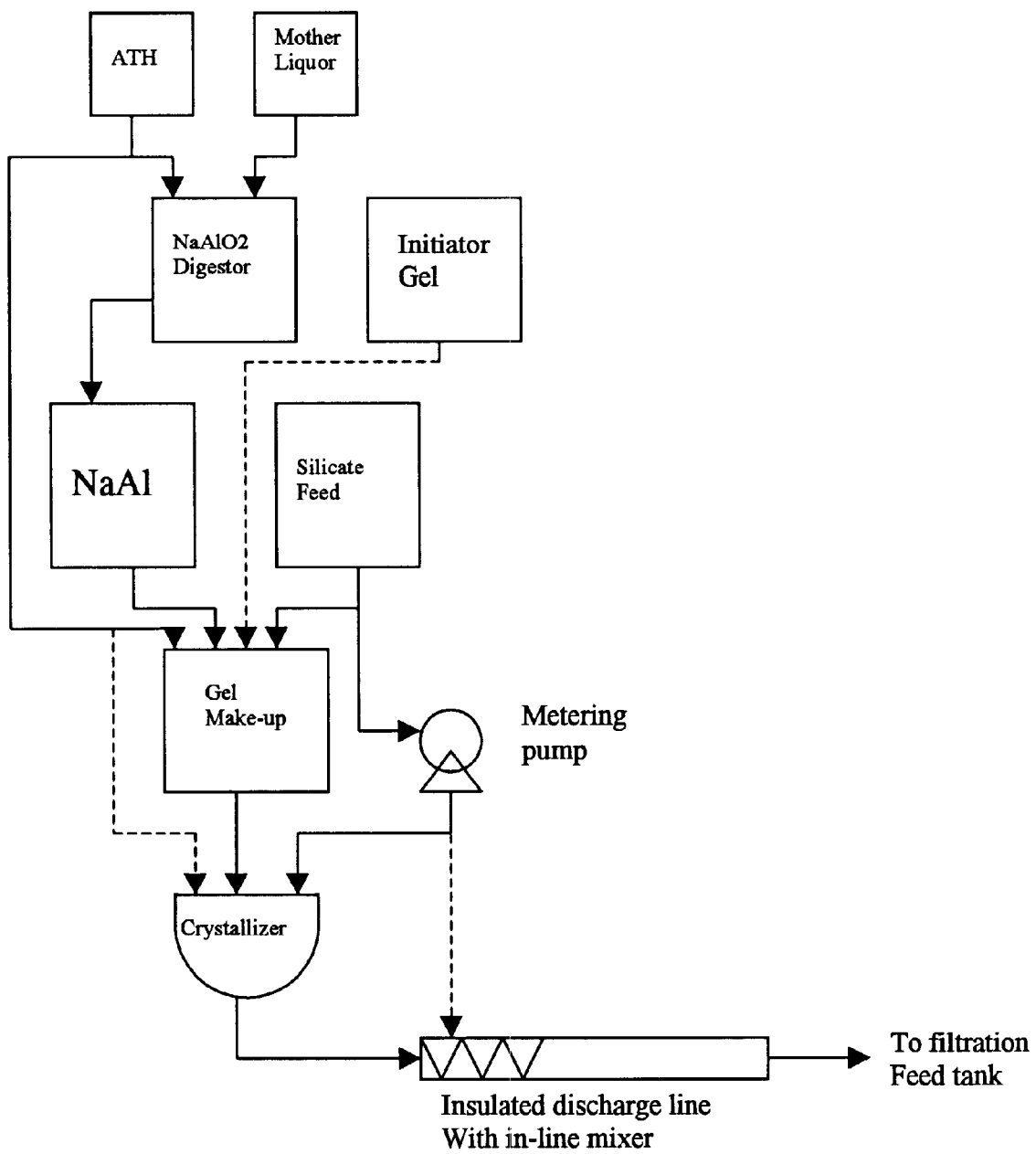
FIG. 9 is a schematic drawing of another exemplary process of this invention.

Referring to FIG. 9, the present invention also comprises an improved method of manufacture for sodium A zeolite that increases the productivity of existing manufacturing equipment with minimal capital cost. When this improved manufacturing method is operated under certain conditions we have found that the cold water calcium exchange rate performance is significantly improved. A common method for the synthesis of zeolites, such as zeolite A, employs soluble silica and alumina species separately dissolved in aqueous alkaline solutions. In the usual practice these solutions are combined in proportions such that the total composition contains a slight excess of $Al_2O_3$ over that amount stoichiometrically required to react with available $SiO_2$ to form zeolite A. Solutions of alumina in caustic are commonly prepared by dissolving some commercially available alumina source such as $Al(OH)_3$ in aqueous sodium hydroxide. Dissolution of the alumina solids is promoted by heating in open vessels or in pressure autoclaves sometimes referred to as digesters. In the improved manufacturing process an ordinary gel synthesis formulation is first prepared in any one of the variety of ways known in the art to produce zeolite A. To this initial mixture, called hereinafter the primary gel, a substantial excess of alumina, over that required to react with available $SiO_2$, is added, undissolved, in the form of crystalline aluminum hydroxide (gibbsite, hydragilite, alumina trihydrate, ATH) or other form of base soluble alumina. As this primary gel composition is heated, according to known practice to effect conversion of the amorphous components to zeolite A, some part of the excess, undissolved, ATH may also dissolve slowly so that near the point where crystallization of the primary gel is complete, all, or a substantial fraction of, the excess ATH has dissolved. In this way the zeolite crystallizer can be made to serve the same function as the alumina digester, effectively enlarging existing plant capacity for this unit operation.

This process enables the aluminate digester to be eliminated from the manufacturing process altogether. By recycling the soluble-aluminate-enriched mother liquor to a subsequent batch synthesis, the mother liquor can supply the required proportion of soluble aluminate necessary to the synthesis. Concentration of this enriched mother liquor may be necessary, however, to maintain the water balance in the recycle system.

When the primary gel has been fully crystallized in the first crystallization stage, the solution phase, or mother liquor, in which the zeolite crystals are dispersed, is now proportionally enriched in the soluble aluminate component required for synthesis. We have discovered that the addition of an further quantity of soluble silica to this slurry now allows a second stage crystallization of additional product in the same reaction vessel without requiring more time to prepare and combine reagents and bring them to crystallization temperature. The relatively small volume of added silicate for the second stage crystallization can be added at ambient temperature or can be heated to near the temperature of the crystallizer slurry. Furthermore, we have found that the conversion of reagents to product in this second stage crystallization occurs much more rapidly than would be the case for synthesis of material in conventional practice. Under optimum conditions the conversion appears to be effected nearly instantaneously. Thus, additional silica reactant may be added to the hot slurry of the primary crystallization so as to effect additional manufacture of product either in the crystallizer itself or in the piping used to discharge and transfer hot product slurry from the crystallizer to the next manufacturing operation.

It should be understood that, given this rapid secondary crystallization rate, the magnitude of enhanced batch yield for this synthesis process is not restricted by the volume of the existing crystallizer. If the additional silicate for the secondary synthesis is added to the transfer line containing the hot slurry of zeolite and $Al_2O_3$ enriched mother liquor then the enhanced yield is limited, in principle, only by the amount of undissolved alumina in the primary gel that can be brought into solution to react with silicate during the combined residence time of the batch slurry in the crystallizer and transfer line. Addition of fresh silicate solution to the crystallizer discharge stream of such a synthesis batch preferably requires provision for metered flow of silicate and for good mixing within the transfer piping. Either mechanical mixers or static in-line mixers, known in the art, may be adopted for this purpose. Insulation of the transfer piping is preferably provided to limit cooling which would reduce crystallization rate in the secondary synthesis mixture. Because the process of this invention allows a deliberate expansion in the yield of a synthesis batch by incremental amounts directly proportion to the amount of added excess alumina, we refer to the process as "Augmented Synthesis".

The excess alumina added to the crystallizer is in an insoluble form. We have observed that much of this excess alumina remains as a crystalline solid while the primary reaction between soluble aluminate and silicate proceeds through the stages of gel formation, nucleation and crystal growth. The presence of crystalline alumina in the synthesis solids can be detected by the presence of a strong X-ray diffraction peak at 18.1 degrees 2-theta (Cu Kα).

The zeolite products of this invention were characterized using X-ray diffraction and by measurement of the Ca exchange rates and capacities. The determination of percent crystallinity, and the detection of crystalline phase components, was made using the Philips X-ray Diffractometer, Model X'pert MPD VW3040 mentioned above. The areas under selected peaks in the diffraction pattern were compared with corresponding areas in the pattern of a standard reference material accepted to be 100% zeolite A.

The $Ca^{2+}$ exchange rate (CER) and capacity (CEC) of zeolites can also be determined by an electrode method using a Ca selective electrode. With such electrodes measurement of Ca exchange on zeolites can be specifically detected in the presence of $Mg^{2+}$. CER/CEC data for Examples 14, 15 and 16 were determined using the electrode method. Ca exchange properties are again represented by values for CER and CEC given as milligram equivalents of $CaCO_3$ removed from a standard solution per gram of anhydrous zeolite at 2 minutes and at 15 minutes, but in this case these values are read from a continuous plot of the Ca concentration data generated by the calibrated electrode. The $Ca^{2+}$ concentration, in a test solution containing the dispersed zeolite powder, is measured continuously over time by means of an Orion Model 720A pH MV meter employing an Orion Model 93-20 Ca selective electrode with and Orion Double Junction reference electrode.

A stock solution of Ca and Mg chlorides is prepared as a reagent for the measurement. The stock solution consists of 22.60 g $CaCl_2.2H_2O$ and 10.42 g $MgCl_2.6H_2O$ diluted to 1000 ml in a volumetric flask. A stock buffer solution is prepared using: 28.01 g 50 percent NaOH solution; 29.23 g NaCl and 26.28 g of glycine diluted to 1000 ml in a volumetric flask. The Ca concentration of this stock solution is validated by a separate analysis by standard EDTA titration. In a typical analysis 10 ml of the stock solution and 10 ml of the buffer solution are added to 990 ml of de-ionized water to generate a test solution containing approximately 154 ppm equivalents of $CaCO_3$. The stock and buffer solutions are stored in a constant temperature bath at the targeted temperature chosen for the test (10° C.) as is the freshly prepared test solution. The zeolite powder to be tested is equilibrated in air to a uniform and constant moisture content and its LOI measured by calcination for 0.5 hour at 800° C. A sample of this powder is weighed so as to give a quantity of zeolite near 0.320 grams on an anhydrous basis. Weighing is done to an accuracy of ±0.1 mg. After taking an initial electrode reading of the test solution, the powder is quickly added to the test solution while it is stirred by a magnetic stir bar. Electrode readings are continuously recorded over time and the data stored as an Excel® file in a laboratory PC. A calibration curve for the electrode at 10° C. is prepared by recording the electrode millivolt readings which correspond to the addition of 0.5, 1.0, 5.0 and 10.0 ml aliquot portions of the standardized stock solution to 990 ml of de-ionized water containing 10 ml of the buffer solution.

The augmented synthesis process may also be used for formulating mixtures of A and X zeolites. In such a process, for the conventional mole oxide formula representation, if one considers the total batch alumina expressed in moles to be 1+C, where C is the portion of alumina reacted with the soluble silica in the second crystallization step, then if the undissolved soluble alumina is greater than or equal to about (0.35+C)/(1+C), and an aluminosilicate initiator is added in the first crystallization stage, then the zeolite product made in the first crystallization stage may comprise a mixture of zeolite A and zeolite X. The second crystallization stage makes additional zeolite A, such that the total output of both stages is a mixture of A and X. Thus, the amount of undissolved alumina added in the first crystallization stage may be adjusted as desired to provide a desired final A/X ratio in the mixture.

Further Examples

In the following examples two standard reagent solutions are used in most of the synthesis preparations. An aqueous solution of sodium silicate (JL-Silicate: 25.8% $SiO_2$; 16.7% $Na_2O$ obtained from PQ Corporation) was used in every case as a convenient source of $SiO_2$ for the synthesis preparations. Other sources of soluble silicate known in the art may also be used. A stable solution of sodium aluminate was prepared as a standard reagent. To prepare a stock supply of this aluminate 717 grams of alumina trihydrate (65% $Al_2O_3$) was charged to a stainless steel container and 1024 grams of 50 weight percent NaOH (38.75% $Na_2O$) was added. The vessel was covered to retard evaporation and heated to boiling on a laboratory hot plate until the alumina solids dissolved. The solution was allowed to cool moderately and was then transferred to a weighed plastic storage bottle and diluted with de-ionized water to give a total solution weight of 2000 g with the following overall composition: 23.3% $Al_2O_3$; 19.8% $Na_2O$. This reagent is cooled to ambient temperature before use.

Example 10

In the following experiments we have extended the exploration of zeolite A synthesis using undissolved alumina. A zeolite A synthesis gel was prepared containing not only undissolved ATH but a substantial (20 percent) excess of the stoichiometrically required amount of $Al_2O_3$ needed to form zeolite A with anhydrous composition: 2.0 $SiO_2.Al_2O_3.Na_2O$. This gel composition had the following mole oxide proportions:

3.4 $Na_2O.1.2Al_2O_3.1.93\ SiO_2.100\ H_2O$ which reduces to:

2.8 $Na_2O.1.0Al_2O_3.1.61\ SiO_2.83\ H_2O$.

A test batch of zeolite A having this mole oxide composition was prepared in the following way: 811 grams of the standard Na-silicate solution were added to a stainless steel mixing vessel equipped with one inch, vertical, quadrant baffles. Mixing of the vessel contents was accomplished by means of a pitched-blade, turbine agitator driven by an electric lab motor. In a separate vessel 2200 grams of de-ionized water were combined with 628 grams of the standard sodium aluminate solution to which was added 302 grams of 50 weight percent NaOH solution (38.8% $Na_2O$). This modified aluminate solution was cooled to 30° C. and then added to the reaction vessel containing the silicate over a period of 35 minutes by means of a peristaltic laboratory pump (Masterflex Pump Model 7524-10, Barnet Mfg. Co. Barrington Ill. 60010, USA). Vigorous mixing conditions were maintained throughout this gel make up period. When the make-up of this gel was complete, 115 grams of ATH powder was added to the mixture, again with vigorous mixing. This amount of undissolved ATH corresponds to 34 percent of the total batch $Al_2O_3$. The gel slurry containing undissolved ATH particles was transferred to a stirred reactor open to the atmosphere via a reflux condenser. The stainless steel reaction vessel was mounted in a closed water bath over-heated initially to 100° C. to increase the rate of gel heat-up but subsequently controlled at 95° C. during the course of the synthesis. With vigorous mixing the gel temperature reached 91° C. in about 15 minutes. 50 ml samples of the reaction slurry were taken at 15 minute intervals for 2 hours. The solids from each slurry sample were filtered and washed with excess de-ionized water on a buchner funnel using Whatman No. 4 fast filter paper. The solids were dried in a laboratory oven, equilibrated in air, and analyzed by X-ray diffraction. The percent zeolite A in the samples was determined by comparison of diffraction peak areas with a reference sample of commercially available VALFOR® 100. The presence of undissolved ATH was detected by the strong diffraction peak appearing at 18.1 degrees 2-theta. The initial height of the ATH peak in the sample at 15 minutes was taken as equivalent to the 33.8 percent undissolved batch $Al_2O_3$ and the percent of undissolved alumina remaining over time was estimated from the change in intensity of this peak during the course of the crystallization. These data are illustrated in FIG. 8.

Figure 8:
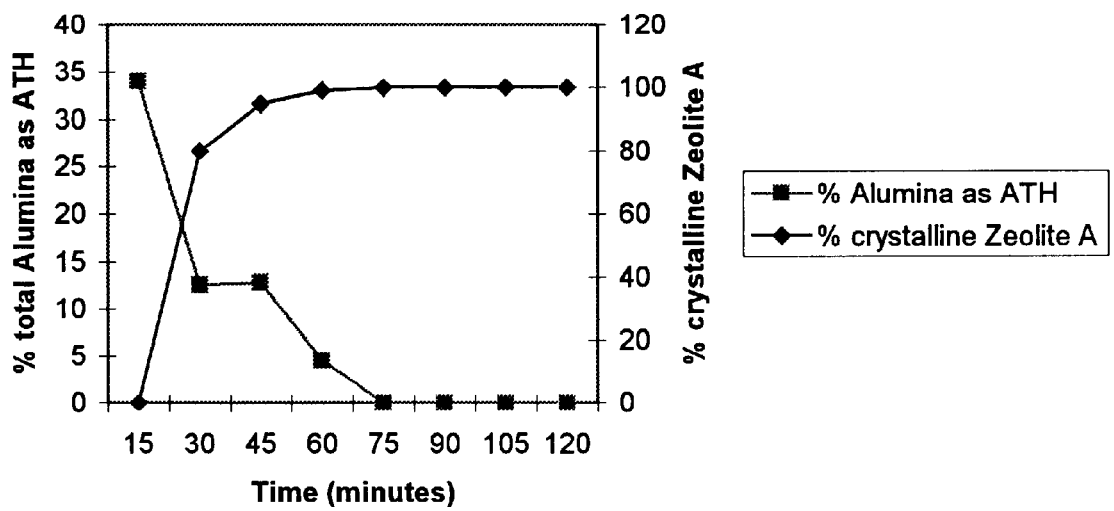
FIG. 8 is a graph illustrating, for an exemplary process of this invention, the disappearance of x-ray diffraction peaks for excess alumina (ATH) as these solids dissolve during the primary crystallization of zeolite A over time.

From FIG. 8, it appears that crystallization of zeolite A under these conditions is complete in about 60 minutes, at which point an estimated 5 percent of the total batch alumina remains undissolved as ATH. This residue of ATH is fully dissolved after less than 15 minutes of further digestion. To convert all the $SiO_2$ in the initial reaction mixture to NaA zeolite having a $SiO_2/Al_2O_3$ mole ratio of 2.0 requires the consumption of 83 percent of the total $Al_2O_3$ in the gel formulation. Part of the original undissolved ATH in the gel mixture dissolves during the course of this primary crystallization and is incorporated in the product; the remainder dissolves rapidly in the caustic mother liquor where it is potentially available to react with additional silicate thus increasing batch yield. Further examples illustrate the advantages of using this procedure to enhance the yield in batch synthesis of zeolite A and the overall productivity of manufacturing plants of fixed name-plate capacity.

Example 11

This example illustrates the application of the invention via the simultaneous addition of the silicate and aluminate reagents to form the initial gel. A Na-aluminate/ATH slurry was prepared by combining 542 grams of 50 percent NaOH solution together with 1300 grams de-ionized water and 302 grams of ATH in a stainless steel container equipped with a tight fitting lid, agitator, and reflux condenser. The mixture was heated on a hot water bath at 95° C. with continuous mixing. The composition of this reaction mixture was expected to have been sufficient to dissolve approximately 80% of the ATH solids under these conditions. A substantial portion of undissolved solids remained, as indicated by the "milky" appearance of the slurry. This slurry, at 95° C., constituted the alumina feed. 700 grams of the stock Na-silicate solution were weighed into a 250 ml plastic beaker; this solution, at ambient temperature, constituted the silicate feed. A covered steel reaction vessel equipped with baffles and agitator was placed in a water bath controlled at 95° C. and charged with 600 grams of de-ionized water. The silicate and alumina reagents were connected to the reaction vessel via a pair of Masterflex laboratory pumps already described in Example 10. When the water in this reaction vessel reached 95° C. the silicate solution and the aluminate slurry were transferred simultaneously to the stirred reaction vessel. The silicate was transferred to the reaction vessel over a period of 15 minutes while the alumina slurry was transferred over a period of 30 minutes so that the combining proportions were never identical to the final gel stoichiometry during the make-up. At the end of reagent addition, the temperature of the gel mixture was at 95° C. The final gel stoichiometry in terms of oxide moles was:

2.74 $Na_2O.Al_2O_3.1.56\ SiO_2O_2.79.1\ H_2O$

After one hour of crystallization at 95° C. a sample of the initial gel was taken, filtered, washed and prepared for x-ray diffraction analysis which later showed partial crystallization of NaA (71%) with a substantial residue of undissolved ATH and a trace of an impurity phase tentatively identified as gismondine (P). To this hot reaction slurry 149 grams of the same silicate solution used in the initial gel make-up were added instantly at ambient temperature. Some gelation was observed to occur as a result of this silicate addition, but this was quickly dissipated. Digestion of the augmented mixture was continued for an additional 15 minutes at 95° C. at which point the reaction slurry was filtered, washed, dried and subjected to x-ray diffraction analysis. The analysis showed that the product solids were now 88% crystalline relative to a reference NaA material and contained a small amount of undissolved ATH together with the trace of the P phase. The dried filter cake was equilibrated with air and agglomerates in the filter cake were broken up and dispersed by dry mixing in a laboratory blender (Waring Commercial Blender Model 34b197) at high speed for one minute. Ca exchange properties in cold water (10° C.) were measured by a electrode method described herein, providing the following results: CER: 171 and CEC: 264.

The excess silicate (149 grams) added to the synthesis mixture was converted to zeolite A by reaction with the excess alumina dissolved in the batch. Since $Al_2O_3$ remains in excess during this synthesis, the limiting reagent is $SiO_2$ and the increased batch yield is directly proportion to the amount of added silicate, 149/700, or about 21 percent. The calculated $Na_2O/Al_2O_3$ mole ratio in the final mother liquor was 33. The significance of this number is discussed herein later.

Example 12

In this example the quantity of excess $Al_2O_3$ in the batch formulation was increased by more than 40 percent. 710 grams of stock Na-silicate solution were charged to the baffled mixing vessel used in Example 2. A soluble aluminate reagent solution was prepared in a 4 liter plastic beaker by combining 551 grams of the standard aluminate with 264.5 g of 50 percent NaOH solution (38.8% $Na_2O$) and 1925 grams of de-ionized water. The synthesis gel was prepared by adding this Na-aluminate solution to the silicate solution in the mixing vessel with intensive mixing over a period of 30 minutes. When the aluminate addition was complete, the mole oxide composition of the initial gel mixture was:

4.23 $Na_2O.Al_2O_3.2.42\ SiO_2.124H_2O$

ATH powder (151.6 grams) was added to this mixture with stirring and the mixture transferred to the same crystallizer described in Example 1. With the addition of this undissolved alumina source the overall composition of this mixture becomes:

2.39 $Na_2O.Al_2O_3.1.37\ SiO_2.71.5\ H_2O$

The crystallizer containing this mixture was placed in a water bath at 95° C. and allowed to equilibrate with continuous stirring. The gel reached 95° C. is about 25 minutes and digestion was continued at temperature for 70 minutes when a 50 cc sample was taken for analysis. Subsequently, after processing by filtration, water washing, drying and equilibration, the sample was found to be fully crystalline, phase pure, zeolite A with no trace of undissolved ATH.

Directly after the test sample was taken, 297 grams of stock silicate solution were pumped over a 5 minute interval into the stirred slurry at temperature using the peristaltic pump previously described. The addition of this additional silicate to the reaction slurry in the crystallizer occurred without evidence of any gelation in the mixture in terms of increased viscosity. Directly after this addition was completed the crystallizer was removed from contact with the hot water bath and the contents filtered, water washed and dried in an oven. X-ray diffraction analysis showed that the sample was 100 percent crystalline relative to a reference standard.

The results show that, with the excess alumina fully dissolved, and in the presence of so much zeolite A acting as "seed", the addition of 41.8 percent more soluble silicate, as limiting reagent, results in the crystallization of an equivalent additional amount of zeolite A at a rate very much faster than can be accomplished by conventional gel synthesis. Indeed, the apparent lack of any gel formation suggests that, in the presence of so much crystalline A "seed", the conversion of fresh reactants to crystalline A may occur without the intermediate formation of any gel phase such as is seen in more conventional synthesis. Conventional crystallization of zeolites is slow, in part, due to the prolonged induction period that precedes zeolite nucleation and the start of crystal growth. Even in the presence of growing nuclei, however, it seems likely that the slow or rate-determining step in the conventional synthesis of zeolite is the dissolution of gel solids and that the true rate of assimilation of nutrients from solution is very rapid. The conditions obtained in the process of this invention where large amounts of crystal surface are available for growth take advantage of this rapid growth rate. In the absence of substantial crystal surface area available for growth, the addition of fresh reactants generates a super-saturated condition that favors precipitation of an amorphous gel phase. When the manufacturing process is operated in this way with a substantial excess of alumina in the synthesis mixture and a corresponding functional excess of $Na_2O$ in the initial gel, several important advantages accrue to the manufacturing process:

1. The higher alkalinity in the gel formulation enhances the rate of the primary crystallization, to shorten the synthesis cycle time without penalty.

2. The preparation of some portion of the soluble aluminate required for synthesis is accomplished within the crystallizer nearly simultaneously with the primary crystallization. This effectively expands the capacity of an existing plant to manufacture the soluble aluminate reagent without the additional capital cost required to supply digester equipment and space within the existing plant facility. Small savings in energy costs can also be realized from this manufacturing approach since thermal energy required for the dissolution of the extra alumina is available in the sensible heat content of the primary synthesis batch.

3. Because the conversion in the augmented process occurs so rapidly the augmented crystallization may be performed outside of the crystallizer itself. The addition of extra silicate to the primary synthesis slurry, as in this example, may be effected by adding the fresh reagent to the hot discharge from the crystallizer as the crystallizer product is transferred to the next stage of the manufacturing operation. This expands the potential productivity of an existing plant without any requirement to increase crystallizer capacity. Implementation of the process of this invention may still require capital expense, for example, in the purchase and installation of additional filtration and/or drying equipment to process and recover the enhanced productivity of existing synthesis equipment, but still at substantially less capital cost than would be required for a linear increase in all unit operations to effect the same productivity enhancement.

Example 13

This example illustrates an attempt to augment a standard synthesis batch by 80 percent. All bench scale equipment used for this synthesis is the same as described in previous examples. 710 grams of the stock Na-silicate solution was added to the mixing vessel. In a 4 liter plastic beaker 551 grams of a standard Na-aluminate solution was combined with 264.5 grams of 50 percent NaOH solution and 1925 grams of de-ionized water. This aluminate solution was added to the silicate solution in the mix vessel over a period of 30 minutes under conditions of intensive mixing. The initial gel composition is identical to that formed in Example 3:

4.23 $Na_2O.Al_2O_3.2.42\ SiO_2.124H_2O$.

253.2 grams of the same ATH powder was added to this initial gel with vigorous mixing to give the overall primary system composition:

1.85 $Na_2O.Al_2O_3.1.06\ SiO_2.56\ H_2O$

This composition was again heated to 95° C. in about 25 minutes and digested for 1.5 hours. At this time the temperature was checked and found to have drifted downward so that the actual batch temperature was 90° C. at this time. The experiment was continued and 593 grams of stock silicate solution at ambient temperature were pumped into the reactor over a period of 13 minutes. Immediately after the addition of the silicate was complete, the batch was filtered and the recovered solids washed with excess de-ionized water. Subsequent x-ray diffraction analysis of the product showed that the material was fully crystalline zeolite A with a trace of undissolved ATH detectable.

Example 14

The product of this invention was prepared at the 50-gallon synthesis scale. In a baffled, steam-jacketed, stainless steel tank, 23.4 kg of 50% NaOH solution was combined with 12.25 kg of de-ionized water, and 8.45 kg of ATH powder was added with vigorous mixing. The mixture was heated to 210° F. and held at temperature for 2 hours. At this time the solution in the vessel was free of turbidity indicating full dissolution of the ATH reagent. Heating of the vessel was discontinued and 70.3 kg of additional de-ionized water at room temperature was added to this solution. The diluted aluminate solution was allowed to cool until the temperature reached 150° F.

In a separate, baffled, steam-jacketed, stainless steel vessel with a total capacity of 50 gallons, 30.4 kg of stock Na silicate solution were added at ambient temperature first, followed by the addition of 4.32 kg of ATH powder directly to the silicate. The aluminate solution described above was pumped into this intensively stirred mixture over a period of 30 minutes. The resulting primary gel composition was heated rapidly to 190° F. by means of a sparge pipe to inject steam (10–15 psig) directly into the gel. After this rapid heat-up the temperature was maintained at 190° F. for 1.5 hours. At this point 6.36 kg of the same Na-silicate solution used in the make-up of the primary gel, heated to 150° F., was charged into the mixture at the rate of approximately 1000 ml/min such that the addition was complete in 5–6 minutes. Under these conditions, with continuous intensive mixing, no gel was observed to form during the generation of the augmented composition. Directly after the addition of this fresh silicate reagent the steam feed to the crystallizer jacket was turned off and replaced with a flow of cold water. Simultaneously, approximately 5–10 gallons of de-ionized water were added to the product slurry to reduce the slurry temperature to 150° F. The solids were filtered on a plate and frame filter press and washed in situ with 100 gallons of de-ionized water delivered from a feed tank maintained at 150° F. Compressed air was passed through the filter cake for 15 minutes to displace interstitial water. These wet solids were dried further in a pilot scale ring dryer. Solids from the filter press were analyzed by X-ray diffraction and found to be fully crystalline zeolite A with no detectable trace of undissolved ATH. Solids from the pilot ring dryer, which simulate the dispersibility found in commercial product, were evaluated for Ca exchange properties under cold water (10° C.) conditions. At 2.0 minutes the sample removed 200 mg equivalents $CaCO_3$ per gram zeolite from the test solution (CER); at 15 minutes the sample removed 292 mg equivalents $CaCO_3$ per gram of zeolite (CEC). Both of these values represent significant improvement over the equivalent data obtained for a standard plant VALFOR® 100 sample measured under the same conditions. (Table 7).

SEM examination of this example of the invention shows that the crystal and particle morphology of the product is essentially the same as that of a standard VALFOR® 100 product of commercial manufacture. In the standard product cubic crystals of zeolite A are observed with edge lengths of 1–2 microns. These crystals are frequently agglomerated or inter-grown. In this example, for which the yield has been augmented by approximately 20 percent, all of the additional material appears to have been added as growth to the existing crystals rather than as a new population of smaller crystals. For a simple cubic crystal of zeolite A, weight increases proportional to the cube of the edge length. For a cube with edge length of 1.0 micron an increase of 20 percent in crystal weight of uniform density requires only an increase in edge length to 1.06 microns. For simple growth of an original crystal, this dimensional change could not be detected by SEM. The $Na_2O/Al_2O_3$ mole ratio in the mother liquor was calculated as 59.

Example 15

In order to determine directly the influence of the augmented process on the morphology of our standard VALFOR® 100 product, a slurry of commercial VALFOR® 100 powder was prepared in a synthetic mother liquor containing an excess of dissolved $Al_2O_3$ with an augmentation of 20 percent. The identical experiment was conducted three times (a–c, below) with the only difference in each experiment being in the temperature of the extra silicate and the rate at which the silicate was added to the slurry of zeolite crystals and alumina enriched mother liquor. A control experiment (d, below) without silicate addition was also performed.

200 grams of standard aluminate solution were charged to a 4 liter plastic beaker containing 2600 grams of water to which had been added 574 grams of 50 percent NaOH solution and 637 grams of VALFOR® 100 powder having an LOI of approximately 22 weight percent. The slurry was transferred to the atmospheric reaction vessel previously described and heated in a water bath set at 95° C. for one hour. At this time, using intensive mixing, 171 g of the stock Na-silicate solution was added in the manner described below for each sub-set of conditions A–D:

A. The silicate solution, at ambient temperature, was added instantly to the stirred reaction mixture. The mixture was observed to increase in viscosity suggesting formation of some gel phase. This viscosity rapidly disappeared and after 5 minutes of additional digestion at temperature the slurry was filtered and washed as described in earlier examples.

B. The same quantity of silicate solution was first heated to 50° C. and pumped into the reaction mixture over a period of about 3 minutes. No visible increase in viscosity occurred with this mode of addition, suggesting that no gel phase was formed. The digestion was stopped directly after the silicate addition and the solids filtered and recovered as before.

C. The same quantity of silicate solution was heated to 50° C. and pumped into the reaction slurry over a period of 6 minutes. No evidence of gelation was observed. The solids were immediately recovered as before.

D. In this experiment no additional silicate was added to the slurry of VALFOR® 100 in the aluminate liquor. After heating the mixture to temperature and holding for one hour the original zeolite solids were recovered by filtration and washing as in the samples above.

The samples recovered in the above experiments were analyzed by x-ray diffraction and found to be fully crystalline and phase pure. The materials were dried in an oven at 95° C. for about 72 hours and each sample was dispersed in a laboratory Waring blender for 1 minute to break up agglomerates. The samples were each analyzed for Ca Exchange rate performance per the Ca-selective electrode procedure described separately in this document. The results of these measurements are given in Table 7.

TABLE 7

Exchange Rate Data

| Experiment | Description | CER 10° C. (2 minutes) mg Ca/g zeolite | CEC 10° C. (15 minutes) mg Ca/g zeolite |
| --- | --- | --- | --- |
| A | Instant addition | 177 | 289 |
| B | 3 min. addition | 170 | 281 |
| C | 6 min. addition | 159 | 279 |
| D | No addition | 148 | 249 |
| Control | Typical VALFOR ® 100 | 170 | 260 |

As can be seen from these results the cold water exchange rates (CER) for the augmented samples appear to be comparable to values obtained for typical VALFOR®. The total exchange capacity measured at 15 minutes approximates an equilibrium value and a appears, consistently, to be somewhat improved over the value for typical VALFOR® 100. From experiment (d) it would appear that prolonged digestion of the starting VALFOR® 100 in the alumina enriched mother liquor may actually be detrimental to exchange rate performance, perhaps due to alkaline attack on the zeolite crystal surfaces. Whatever damage does occur, it appears to be readily repaired by subsequent addition of the silicate in the final stage of augmentation.

SEM examination of the products from these experiments indicate that the general size of the product crystals is indistinguishable from the size and agglomeration found with commercial VALFOR® 100. Some differences in the flat surfaces of product crystals are observed that appear to be a function of the rate of silicate addition during the second stage synthesis with faster addition giving more evident surface growth. Silicate temperature may also be a factor. With instantaneous addition of the silicate (accompanied by some indication of gel formation) there appears to be a substantially greater degree of surface irregularity on the crystals than appears with slower rates of silicate addition and the absence of a transient increase in the viscosity of the slurry. The form of this irregularity is suggestive of surface nucleation. Increased surface irregularity will result in some increase in the external surface area of these relatively large crystals. The calculated $Na_2O/Al_2O_3$ mole ratio in the final mother liquor from this example was 31.

Example 16

An experiment was conducted to investigate the role of gel phase formation in the improvement of exchange rate performance in the augmented process. In this example a slurry of VALFOR® 100 was again prepared in a synthetic mother liquor composition without alumina enrichment. 500 grams of VALFOR® 100 (PQ Corporation) was slurried in 2260 grams of de-ionized water. 559 grams of NaOH and 20 grams of the standard aluminate solution were added. The slurry was transferred to the crystallizer in the same water bath at 95° C. and heated with good agitation for one hour. In the meanwhile, a gel mixture was prepared at room temperature by combining and mixing 81 grams of the stock Na-silicate solution and 220 grams of de-ionized water in a Waring blender. In a separate container, 29 grams of the 50% NaOH solution was added to 79 grams of the standard aluminate solution. This solution was added to the silicate in the blender over a period of about 2 minutes while the blender agitator was set at the highest speed. After completion of the addition, the same mixing was continued for an additional minute. The gel produced in this way became very viscous as the addition of aluminate proceeded and remained this way with further mixing. The final gel mixture was added to the zeolite slurry in the crystallizer at temperature and the new mixture digested with intensive mixing for an additional 15 minutes. The solids were recovered by filtration, washed, and dried.

Product solids were fully crystalline and free of impurities. After drying at 95° C., the solids were dispersed in the blender for one minute, equilibrated in air, and tested for exchange rate performance. The measured 10° C. CER for this sample was 185 and the CEC was 299. Augmented growth in the presence of a gel phase that has been separately prepared at ambient temperature generates a zeolite material with moderately improved exchange characteristics as compared with a VALFOR® reference. It is possible that the secondary gel in this instance, which was freshly prepared at ambient temperature, is more reactive than secondary gels prepared in situ and for that reason promotes the more rapid and disorderly growth that, as argued earlier, favors improved exchange rates. The calculated $Na_2O/Al_2O_3$ mole ratio in the final mother liquor for this example was 59. The next series of experiments indicates that this parameter of the mother liquor is of some importance in determining the exchange performance of the zeolite product.

Example 17

In further experiments we investigated the influence of the final mother liquor on the quality of the product of augmented synthesis. The objective was to determine whether the quality of the product was sensitive to the mother liquor composition ($Na_2O/Al_2O_3$ mole ratio), temperature and contact time. The composition of the final batch mother liquor was varied by varying the amount of added Na-silicate solution in the second stage synthesis.

820 grams of the standard silicate solution was added to the 4-liter baffled reactor previously described. In a separate 4-liter plastic container, 628 grams of standard Na-aluminate were combined with 298 grams of 50 percent NaOH solution and diluted with 2196 grams of water. This solution was allowed to cool to room temperature. The cooled aluminate solution was pumped into the agitated silicate solution over a period of 30 minutes using the Masterflex pump. During this period the combination of soluble silicate and soluble aluminate formed a viscous gel with a nominal $SiO_2/Al_2O_3$ mole ratio of 2.45. 113.5 grams of alumina trihydrate was added to this gel mixture to give a total composition: $2.82Na_2O.Al_2O_3.1.63\ SiO_2.84\ H_2O$. This mixture was heated in a hot water bath reaching a temperature of 95° C. in approximately 30 minutes. Digestion was continued for 60 minutes, at which point 181.6 grams of JL silicate was added rapidly at ambient temperature. The final temperature of the gel mixture was measured as 90° C. This final gel composition was divided into roughly two equal parts. One part was filtered hot on a buchner funnel and washed with approximately 2 liter of de-ionized water. The second part of the gel was retained in its mother liquor and allowed to cool overnight.

The experiment was repeated again but following the final addition of silicate the hot slurry was quenched with an equal volume of de-ionized water at room temperature and immediately filtered and washed.

Samples of the crystalline A product from these three experiments were evaluated for CER and CEC properties at 10° C. by the titration method.

TABLE 8

| Sample | CER (10° C.) | CEC (10° C.) |
|---|---|---|
| Filtered Hot | 161 | 263 |
| Cooled/filtered | 123 | 241 |
| Quenched/filtered | 191 | 275 |

The final synthesis system had the approximate composition:

$3.0Na_2O.Al_2O_3.2.0\ SiO_2.86\ H_2O$

Assuming that silica is almost quantitatively consumed to form zeolite A with the composition $2SiO_2.Al_2O_3.Na_2O$ this generates a strongly alkaline mother liquor with a $Na_2O/Al_2O_3$ mole ratio of 466. Under these conditions where the mother liquor contains only ppm of dissolved $Al_2O_3$, we believe that the crystalline product of the reaction is attacked and damaged by the mother liquor. Hot filtration results in less damage than cooling in the presence of mother liquor, but immediate quenching and separation of the solids has the best effect on minimizing damage to the zeolite performance. Quenching, however, requires substantial dilution of the mother liquor requiring subsequent concentration of this liquor before re-cycle to maintain water balance.

Example 18

The following experiments were conducted to evaluate the effect of reducing the $Na_2O/Al_2O_3$ mole ratio in the mother liquor by adding less silica in the second stage crystallization. The identical primary gel composition was prepared and treated as in example 14. After one hour digestion, 169 grams of the silicate solution was added to the slurry. This gave a final composition of:

$3.0Na_2O.Al_2O_3.1.97\ SiO_2.86\ H_2O$ with $Na_2O/Al_2O_3=111$ in the mother liquor.

The cold water CER/CEC values for this sample were: 141/148 respectively.

Example 19

The same basic synthesis was repeated with 807 grams of the silicate solution combined with a aluminate reagent made up of 628 grams of standard aluminate solution and 304 grams of 50 percent NaOH solution. After combination of these reagents to form a primary gel 113.6 grams of alumina trihydrate reagent were added as a powder and the mixture heated to 95° C. and digested for one hour. After one hour 144 grams of the same silicate reagent was added to the slurry, following which the slurry was filtered and washed with 2 liters of water.

In this instance with substantially less silica added in the second synthesis stage the gel composition was: was:

$3.0Na_2O.bAl_2O_3.1.9\ SiO_2.86\ H_2O$

Making the same assumption with respect to complete conversion of the silica to zeolite A the $Na_2O/Al_2O_3$ mole ratio in the mother liquor is calculated as 33. The Ca exchange CER/CEC properties at 10° C. were measured as 209 and 288 respectively indicating that a reduced $Na_2O/Al_2O_3$ ratio in the mother liquor is beneficial with respect to suppressing damage to the zeolite and to its exchange performance.

Example 20

This example illustrates the combination of gel initiation and augmented synthesis in a 200 gallon scale-up demonstration.

To prepare the silicate reagent, 164 kg of de-ionized water was charged to a 200 gallon, steam-jacketed, stainless steel crystallizer vessel equipped with baffles and twin marine prop agitators followed by the addition of 143 kg of N-grade Na-silicate(8.9% $Na_2O$; 28.7% $SiO_2$).

A Na-aluminate solution was prepared in a separate 50 gallon vessel by adding 57.1 kg of alumina trihydrate to 117 kg of 50 percent NaOH solution. Steam was charged to the vessel jacket to heat the contents to about 95° C. The contents were held at temperature with stirring for one hour until the alumina solids were fully dissolved. The concentrated aluminate was diluted with 164 kg of water and the mixture allowed to cool to ambient temperature.

A separate initiator gel was prepared with a formulated composition somewhat different from the composition used in other examples of this invention:

$17\ Na_2O.Al_2O_3.15.2\ SiO_2.306\ H_2O$

To prepare this initiator gel, a Na-aluminate solution was first prepared by adding 62 grams of the alumina trihydrate to a NaOH solution prepared by dissolving 402 grams of NaOH pellets (76% $Na_2O$) in 405 grams of water and heating to boiling on a hot plate until the solids were dissolved. The concentrated aluminate solution was diluted with 872 g of water at room temperature and the mixture allowed to cool to ambient temperature, 1258 grams of N-clear silicate with the composition given above was the silicate reagent. In this instance the silicate and aluminate reagents, at ambient temperature, were combined by adding the silicate solution to the aluminate solution with vigorous agitation. The mixture prepared in this way forms a fluid and clear solution. This mixture was aged at room temperature for 14 hours prior to use.

In the preparation of the synthesis gel, 2.82 kg of the initiator prepared above were added to the Na-silicate solution at ambient temperature and mixed for 15 minutes. This amount of initiator provides 0.1 percent of the total batch $Al_2O_3$. The Na-aluminate solution described above was added to this mixture of initiator and silicate solution over a period of 25–30 minutes with constant agitation. At this point the mole oxide composition of the synthesis mixture was:

$2.6\ Na_2O.Al_2O_3.1.9SiO_2.78\ H_2O$

Following the completion of the aluminate addition, 11.4 kg of the alumina trihydrate powder was added to the gel mixture, generating an overall composition:

$2.2\ Na_2O.Al_2O_3.1.6SiO_2.65\ H_2O$

This gel mixture was immediately heated by introducing steam to the vessel jacket. The mixture was digested at 93° C. for 2 hours, at which point a 100 ml sample of the slurry was taken, filtered, washed and prepared for x-ray diffraction analysis. This analysis later showed that the product was fully crystalline NaA by comparison with a VALFOR® 100 standard and was free of any residue of undissolved crystalline alumina trihydrate. At this point 32 kilograms of the JL-silicate solution at ambient temperature was poured into the crystallizer slurry. No gelation was observed. The mixture was stirred for 15 minutes as a precautionary measure to ensure complete crystallization. Finally a large quantity of de-ionized water was added to the crystallizer to cool the batch so as to allow immediate separation and washing of the product solids using a filter press.

Washed filter cake from this synthesis was dried in an oven at 95° C. A sample analyzed by x-ray diffraction was phase pure zeolite A. A small portion of this dried filter cake was treated in a laboratory blender for one minute at the highest speed to simulate the action of a commercial flash dryer, as discussed earlier. The Ca exchange properties at 10° C. were measured for this material using the titration method. The CER value for this product was 259 mg $CaCO_3$ per gram anhydrous zeolite, while the CEC value on the same basis was 276. These data and the external surface area of the product are compiled in Table 1.

This CER value represents an increase of approximately 52 percent over the performance of a commercial VAL-FOR® 100 sample under the same test conditions. The 2-minute exchange capacity is 94 percent of the 15-minute exchange capacity, so that nearly all the exchange capacity of the zeolite powder of this invention is available and used in the first two minutes of contact with the Ca containing water. Utilization of a larger fraction of total exchange capacity in the first two minutes of contact with Ca-containing solutions is characteristic of the high surface area products of this invention, as illustrated in FIG. 5. Some contribution to the superior performance of this product may be due to the quenching of the synthesis batch and to the relatively low $Na_2O/Al_2O_3$ mole ratio (26) that is calculated from the stoichiometry of the augmented batch. The nominal batch yield based upon the primary synthesis composition is increased by approximately 20 percent in the second stage of this augmented synthesis.

Detergent Compositions

Zeolites of the present invention may be particularly useful as ingredients in detergent formulations. Accordingly, the invention also comprises a detergent composition comprising from 0.1% to 99% by weight of a builder system comprising at least the zeolite of this invention and, optionally, an auxiliary detergent builder salt, and from about 0.1% to about 99% by weight of at least one detergent adjunct other than the builder system, as are known in the art. Such detergent adjuncts include, but are not limited to, detersive surfactants, bleaches and bleach activators, enzymes and enzyme stabilizing agents, suds boosters or suds suppressers, anti-tarnish and anticorrosion agents, soil suspending agents, soil release agents, germicides, pH adjusting agents, non-builder alkalinity sources, chelating agents, organic and inorganic fillers, solvents, hydrotropes, optical brighteners, dyes, perfumes, fabric treatment agents such as polyamide-polyamines, abrasives.

Detergent compositions in general are described in U.S. Pat. Nos. 4,605,509 and 4,274,975, both to Corkill et al. and published PCT Application Serial Number WO/43482, to Burckett-St. Laurent et al, all of which are incorporated herein by reference. The detergent formulation of this invention may comprise any type of detergent, including but not limited to a liquid suspension, a gel, or a powder, and may preferably comprise a laundry or dishwashing detergent, but may comprise any cleaning product.

Those skilled in the art having the benefit of the teachings of the present invention as hereinabove set forth, can effect numerous modifications thereto. These modifications are to be construed as being encompassed within the scope of the present invention as set forth in the appended claims. In addition, although the zeolite products have been identified with reference to certain properties and characteristics, the invention is not limited to these characterizations but also includes other properties and characteristics inherent in the zeolite products formed by the processes of the present invention.

What is claimed:

1. A process for making a zeolite product comprising zeolite A or a mixture of zeolite A and zeolite X, the process comprising the steps of:

(a) mixing a sodium silicate mixture, a sodium aluminate mixture, and an amorphous aluminosilicate initiator gel in a mixing vessel at an ambient or greater temperature to create an aluminosilicate synthesis gel, wherein alumina from all sources within the mixing vessel defines a total batch alumina; and (b) crystallizing the aluminosilicate synthesis gel to form zeolite crystals;

wherein step (a) comprises one of: adding the sodium aluminate mixture gradually to the sodium silicate mixture at a rate such that about 1% to about 5% weight percent of the total batch alumina is added per minute; adding an undissolved source of soluble alumina to the mixing vessel; or a combination thereof.

2. The process of claim 1 wherein the weight of alumina expressed as $Al_2O_3$ added in the amorphous aluminosilicate initiator gel comprises about 0.1 to about 2.0 weight percent of the total batch alumina.

3. The process of claim 1 wherein the sodium aluminate mixture is a sodium aluminate solution containing no undissolved soluble alumina.

4. The process of claim 1 wherein the sodium aluminate mixture contains about 20 weight percent undissolved soluble alumina.

5. The process of claim 1 wherein step (a) comprises adding the undissolved source of soluble alumina to the sodium aluminate mixture prior to adding the sodium aluminate mixture to the silicate in the mixing vessel.

6. The process of claim 1 wherein step (a) comprises adding the undissolved source of soluble alumina to the mixing vessel after adding the sodium aluminate mixture to the sodium silicate mixture.

7. The process of claim 1 wherein step (a) comprises adding the amorphous aluminosilicate initiator gel to the sodium silicate mixture prior to adding the sodium aluminate mixture.

8. The process of claim 1 wherein step (a) comprises adding the amorphous aluminosilicate initiator gel to the mixing vessel after adding the sodium aluminate mixture to the sodium silicate mixture.

9. The process of claim 1 further comprising performing step (a) in a gel make-up tank, transferring the aluminosilicate synthesis gel to a crystallizer, and performing step (b) in a crystallizer.

10. The process of claim 1 wherein the sodium aluminate mixture is gradually added to the sodium silicate mixture in step (a) at rate of about 3.3% of the total batch alumina per minute.

11. The process of claim 10 wherein the sodium aluminate mixture is at a temperature less than about 38° C. prior to being added to the sodium silicate mixture.

12. The process of claim 1 wherein the sodium silicate mixture is at a temperature less than about 38° C. prior to addition of the sodium aluminate mixture.

13. The process of claim 1 wherein the sodium aluminate mixture and sodium silicate mixture are combined simultaneously at temperatures less than about 40° C. in a jet mixer such that initial combining mole proportions of SiO2 and Al2O3 in the jet mixer are greater than about 3.0.

14. The process of claim 13 wherein the sodium aluminate mixture is at a temperature in a range of about 60° C. to about 105° C. and the sodium silicate mixture is at a temperature of at least about 55° C. such that the final temperature of the combined mixtures is greater than about 85° C.

15. The process of claim 14 wherein the sodium aluminate mixture is at a temperature greater than about 90° C.

16. The process of claim 1 wherein the initiator gel has an empirical formula of approximately $16Na_2O.15SiO_2.Al_2O_3.300H_2O$.

17. The process of claim 1 wherein step (b) comprises mixing the aluminosilicate synthesis gel for about 0.75 to about 1.5 hours at about 95° C.

18. The process of claim 1 further comprising the steps of:
(c) filtering and washing the zeolite crystals crystallized in step (b), creating a wet zeolite filter cake; and
(d) drying the zeolite filter cake to form the zeolite product.

19. The process of claim 18 wherein step (d) further comprises particle size reduction of the zeolite during the drying step.

20. The process of claim 18 wherein step (d) comprises drying the zeolite filter cake in one of a ring dryer or a flash dryer.

21. The process of claim 1 wherein the undissolved source of alumina comprises greater than about 22 weight percent of the total batch alumina.

22. The process of claim 21 wherein the undissolved source of soluble alumina comprises about 35 to about 90 weight percent of the total batch alumina.

23. The process of claim 22 comprising in step (a) adding the undissolved source of soluble alumina to one of:
the sodium aluminate mixture prior to the combination of the sodium aluminate and the sodium silicate mixtures;
the sodium silicate mixture in the mixing vessel prior to adding the sodium aluminate mixture; or
the gel mixture obtained by combination of sodium silicate and sodium aluminate mixtures.

24. The process of claim 1 wherein the undissolved source of soluble alumina comprises less than about 35 weight percent of the total batch alumina and in which the zeolite product made by the process comprises almost entirely zeolite A.

25. A process for making a zeolite product comprising zeolite A or a mixture of zeolite A and zeolite X, the process comprising the steps of:
(a) adding an amorphous aluminosilicate initiator gel to a sodium silicate mixture, the aluminosilicate initiator gel having a molar composition $aNa_2O.bAl_2O_3.cSiO_2.dH_2O$ where a ratio of a/c is in a range of about 0.8 to about 9, a ratio of c/b is in a range of about 8 to about 75, and a ratio of d/b is in a range of about 100 to about 600;
(b) preparing a sodium aluminate mixture having undissolved alumina therein;
(c) mixing the sodium silicate mixture and initiator gel with the sodium aluminate mixture at an ambient or greater temperature in a jet mixer to create an aluminosilicate synthesis gel that is charged into a crystallizer; and
(d) crystallizing the aluminosilicate synthesis gel to form zeolite crystals.

26. The process of claim 25 wherein step (a) comprises the amorphous aluminosilicate initiator gel having a molar composition wherein the ratio of a/c is in a range of about 0.8 to about 3, the ratio of c/b is in a range of about 10 to about 30, and the ratio of d/b is in a range of about 200 to about 400.

27. The process of claim 26, wherein the initiator gel has a composition of $16Na_2O.Al_2O_3.15SiO_2.300H_2O$.

28. A process for making a zeolite product comprising zeolite A or a mixture of zeolite A and zeolite X, the process comprising the steps of:
(a) preparing a sodium silicate mixture and directing a stream of said sodium silicate mixture to a jet mixer;
(b) preparing a sodium aluminate mixture having undissolved alumina therein;
(c) adding an amorphous aluminosilicate initiator gel to said stream of said sodium silicate mixture immediately upstream of said jet mixer to form a mixture of said initiator gel and said sodium silicate mixture, the aluminosilicate initiator gel having a molar composition $aNa_2O.bAl_2O_3.cSiO_2.dH_2O$ where a ratio of a/c is in a range of about 0.8 to about 9, a ratio of c/b is in a range of about 8 to about 75, and a ratio of d/b is in a range of about 100 to about 600;
(d) combining the sodium silicate mixture with the sodium aluminate mixture in said jet mixer to create an aluminosilicate synthesis gel that is discharged into a crystallizer; and
(e) crystallizing the aluminosilicate synthesis gel to form zeolite crystals.

29. The process of claim 28 wherein the sodium aluminate mixture is at a temperature in the range of about 60° C. to about 105° C. and the sodium silicate mixture is at a temperature of at least 55° C. such that the final temperature of the combined mixture is greater than about 85° C.

30. The process of claim 29 wherein the sodium aluminate mixture is at a temperature greater than about 90° C.

31. The process of claim 28 wherein step (c) comprises the amorphous aluminosilicate initiator gel having a molar composition wherein the ratio of a/c is in a range of about 0.8 to about 3, the ratio of c/b is in a range of about 10 to about 30, and the ratio of d/b is in a range of about 200 to about 400.

32. The process of claim 31, wherein the initiator gel has a composition of $16Na_2O.Al_2O_3.15SiO_2.300H_2O$.

33. A process for making a zeolite product comprising zeolite A, the process comprising the steps of:
(a) mixing a sodium silicate mixture, a sodium aluminate mixture, and an amount of undissolved soluble alumina in a mixing vessel to create an aluminosilicate synthesis gel having a stoichiometric amount of alumina that reacts with a stoichiometric amount of silica, wherein alumina from all sources within the mixing vessel defines a total batch alumina that is substantially in excess of the stoichiometric amount of alumina;
(b) crystallizing the aluminosilicate synthesis gel in a primary crystallization step to form a crystalline zeolite slurry comprising zeolite crystals in a substantially alumina-enriched mother liquor; and
(c) adding a sufficient amount of soluble silica to the crystalline zeolite slurry to initiate a rapid secondary crystallization step with at least a portion of the alumina in the mother liquor.

34. The process of claim 33, wherein the total batch alumina expressed in moles is 1+C, where C is the portion of alumina reacted in step (c), and the undissolved soluble alumina is greater than or equal to about (0.35+C)/(1+C), the process further comprising adding an aluminosilicate initiator in step (a) and the zeolite product comprising a mixture of zeolite A and zeolite X.

35. The process of claim 33 wherein the process is performed in a zeolite product facility having existing equipment and a maximum production capacity measured in unit weight per time, wherein the process provides a sufficient increase in synthesis batch yield to offset any increase in processing time such that using the process increases the maximum production capacity of the existing equipment.

36. The process of claim 33 wherein the alumina-enriched mother liquor has a $Na_2O/Al_2O_3$ ratio of less than about 60.

37. The process of claim 33 wherein the alumina-enriched mother liquor has a $Na_2O/Al_2O_3$ ratio in a range of about 20 to about 40.

38. The process of claim 33 wherein step (b) is performed in a crystallizer and step (c) is performed at least partially outside the crystallizer.

39. The process of claim 33 wherein the sodium aluminate mixture added in step (a) is formed without using a sodium aluminate digester.

40. The process of claim 39 wherein the sodium aluminate mixture added in step (a) comprises recycled mother liquor from a previous batch and the undissolved source of alumina comprises alumina trihydrate added directly to the mixing vessel.

41. The process of claim 33 further comprising adding an aluminosilicate initiator in step (a).

42. A process for making a zeolite product comprising zeolite A, the process comprising the steps of:

(a) mixing a sodium silicate mixture, a sodium aluminate mixture, and an undissolved source of soluble alumina in a mixing vessel at an ambient or greater temperature to create an aluminosilicate synthesis gel, wherein alumina from all sources within the mixing vessel defines a total batch alumina, the amount of undissolved soluble alumina comprising greater than about 22% of the total batch alumina; and (b) crystallizing the aluminosilicate synthesis gel to form zeolite crystals.

43. The process of claim 42 wherein the amount of undissolved soluble alumina comprises greater than about 30 weight percent of the total batch alumina, the process does not include adding an initiator gel, and the zeolite crystals comprise substantially all zeolite A crystals.

44. The process of claim 43 wherein the undissolved source of soluble alumina comprises between about 35 to about 90 weight percent of the total batch alumina.

45. The process of claim 44 wherein the undissolved source of soluble alumina comprises greater than about 60 weight percent of the total batch alumina.

46. The process of claim 42 wherein the undissolved source of soluble alumina comprises greater than or equal to about 35 weight percent of the total batch alumina, step (a) further comprises adding an initiator gel, and the zeolite crystals comprise a mixture of zeolite A and zeolite X crystals.

47. The process of claim 42, wherein the step of mixing comprises first mixing the sodium silicate mixture and the sodium aluminate mixture, and subsequently adding the undissolved source of soluble alumina.

* * * * *